United States Patent
Xu et al.

(10) Patent No.: US 11,782,682 B2
(45) Date of Patent: Oct. 10, 2023

(54) PROVIDING METRIC DATA FOR PATTERNS USABLE IN A MODELING ENVIRONMENT

(71) Applicant: The MathWorks, Inc., Natick, MA (US)

(72) Inventors: Huanhuan Xu, Wellesley, MA (US); Partha Biswas, Wayland, MA (US); Madhav Rajan, Wayland, MA (US); Sherman Braganza, Brookline, MA (US); Chirag Gupta, Karnataka (IN); Neha Pal, West Bengal (IN); Radhey Shyam Meena, Rajasthan (IN)

(73) Assignee: The Math Works, Inc., Natick, MA (US)

( * ) Notice: Subject to any disclaimer, the term of this patent is extended or adjusted under 35 U.S.C. 154(b) by 88 days.

(21) Appl. No.: 17/374,806

(22) Filed: Jul. 13, 2021

(65) Prior Publication Data

US 2023/0021771 A1 Jan. 26, 2023

(51) Int. Cl.
*G06F 9/44* (2018.01)
*G06F 8/36* (2018.01)
(Continued)

(52) U.S. Cl.
CPC ............. *G06F 8/36* (2013.01); *G06F 8/10* (2013.01); *G06F 8/77* (2013.01)

(58) Field of Classification Search
CPC ............. G06F 8/10; G06F 8/36; G06F 8/77
(Continued)

(56) References Cited

U.S. PATENT DOCUMENTS

| | | | |
|---|---|---|---|
| 7,693,586 B2 * | 4/2010 | Dumas | G06F 8/20 700/32 |
| 7,941,461 B2 * | 5/2011 | Chang | G06F 16/88 707/790 |

(Continued)

FOREIGN PATENT DOCUMENTS

EP 1988672 A1 * 11/2008 ......... H04L 12/2803

OTHER PUBLICATIONS

Monika Jaskolka et al. "Supporting Modularity in Simulink Models"; Jul. 20, 2020.*
(Continued)

*Primary Examiner* — Francisco J Aponte
(74) *Attorney, Agent, or Firm* — Wolf, Greenfield & Sacks, P.C.

(57) ABSTRACT

Systems and methods for providing metric data for patterns in a modeling environment are disclosed. In some aspects, contexts for generating metric data for a pattern are constructed. The pattern represents one or more computations executable in the modeling environment and associated with operation or behavior of a real-world system. The contexts include information about the pattern. The metric data is associated with one or more objectives with which the use of the pattern is associated. Code for the pattern for each context is generated. Metric data is generated for the pattern and under each context. The metric data of the pattern under each context is associated with the objectives. The metric data and the association are stored for use in providing information about or based on the metric data when the pattern is to be or is used in a model representing the real-world system.

32 Claims, 16 Drawing Sheets

(51) Int. Cl.
*G06F 8/77* (2018.01)
*G06F 8/10* (2018.01)

(58) Field of Classification Search
USPC .......................................................... 717/104
See application file for complete search history.

(56) References Cited

U.S. PATENT DOCUMENTS

| | | | | |
|---|---|---|---|---|
| 8,001,519 | B2* | 8/2011 | Conallen | G06F 8/316 |
| | | | | 717/109 |
| 8,234,630 | B2* | 7/2012 | Raghavan | G06F 8/34 |
| | | | | 717/125 |
| 8,621,428 | B2* | 12/2013 | Massoudi | G06F 8/31 |
| | | | | 717/121 |
| 8,707,261 | B2* | 4/2014 | Heller | G06F 8/30 |
| | | | | 717/121 |
| 8,789,009 | B2* | 7/2014 | Lee | G06F 8/35 |
| | | | | 717/113 |
| 8,825,458 | B2* | 9/2014 | Bumbalough | G06F 30/13 |
| | | | | 700/98 |
| 8,869,098 | B2* | 10/2014 | Elaasar | G06F 8/10 |
| | | | | 717/136 |
| 8,887,121 | B2* | 11/2014 | Ravindran | G06F 8/20 |
| | | | | 717/109 |
| 9,335,977 | B2* | 5/2016 | Wang | G06F 9/4494 |
| 9,536,023 | B2* | 1/2017 | Englehart | G06F 9/541 |
| 9,762,435 | B2* | 9/2017 | Shelton | G06F 11/3072 |
| 9,946,989 | B2* | 4/2018 | Bhola | G06Q 10/107 |
| 10,095,488 | B2* | 10/2018 | Ebner | G06F 8/35 |
| 10,255,051 | B2* | 4/2019 | Kulkarni | G06F 8/60 |
| 10,503,784 | B1* | 12/2019 | Dean | H04L 67/10 |
| 10,564,622 | B1* | 2/2020 | Dean | G06F 16/9535 |
| 11,093,222 | B2* | 8/2021 | Klemenz | G06F 8/38 |
| 11,244,090 | B2* | 2/2022 | Szpak | G06F 30/18 |
| 11,513,773 | B2* | 11/2022 | Barke | G06N 20/00 |
| 11,544,046 | B1* | 1/2023 | Zhang | G06F 8/427 |
| 2008/0126027 | A1* | 5/2008 | Altenhofen | G06F 8/10 |
| | | | | 703/2 |
| 2010/0083212 | A1* | 4/2010 | Fritzsche | G06F 8/34 |
| | | | | 703/22 |
| 2010/0162225 | A1* | 6/2010 | Huang | G06F 8/72 |
| | | | | 717/171 |
| 2013/0297528 | A1* | 11/2013 | Stiehl | G06Q 10/06 |
| | | | | 705/348 |
| 2015/0100942 | A1* | 4/2015 | Misbhauddin | G06F 8/20 |
| | | | | 717/104 |
| 2016/0139886 | A1* | 5/2016 | Perdriau | G06F 16/258 |
| | | | | 717/104 |
| 2016/0179474 | A1* | 6/2016 | Pana | G06Q 10/067 |
| | | | | 705/348 |
| 2017/0046235 | A1* | 2/2017 | Straub | G06F 16/2379 |
| 2017/0048339 | A1* | 2/2017 | Straub | G06F 16/2379 |
| 2018/0024814 | A1* | 1/2018 | Ouali | G06F 8/10 |
| | | | | 717/105 |
| 2018/0113647 | A1* | 4/2018 | Palareddy | G06F 3/0659 |
| 2018/0314534 | A1* | 11/2018 | Jahanbanifar | G06F 9/44505 |
| 2018/0364685 | A1* | 12/2018 | Sprenger | G05B 19/4186 |
| 2019/0102162 | A1* | 4/2019 | Pitre | H04L 63/104 |
| 2019/0188006 | A1* | 6/2019 | Ritter | G06F 8/433 |
| 2020/0125956 | A1* | 4/2020 | Ravi | G06N 3/045 |
| 2021/0117548 | A1* | 4/2021 | Gokhman | G06F 16/9027 |
| 2021/0240449 | A1* | 8/2021 | Oara | G06F 8/22 |
| 2021/0303271 | A1* | 9/2021 | Hicklin | G06F 8/33 |
| 2021/0406004 | A1* | 12/2021 | Ray | G06F 8/75 |
| 2022/0019428 | A1* | 1/2022 | Rubio | G06F 8/71 |
| 2022/0019915 | A1* | 1/2022 | Bryan | G06F 17/16 |
| 2022/0229640 | A1* | 7/2022 | Bryan | G06F 8/35 |

OTHER PUBLICATIONS

Monika Jaskolka; "Making Simulink Models Robust with Respect to Change"; a thesis submitted to the Department of Computing and Software and the School of Graduate Studies of McMaster University, Hamilton, ON, Canada—Dec. 2020.*

\* cited by examiner

PROVIDING METRIC DATA FOR PATTERNS USABLE IN A MODELING ENVIRONMENT

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Figure 1:
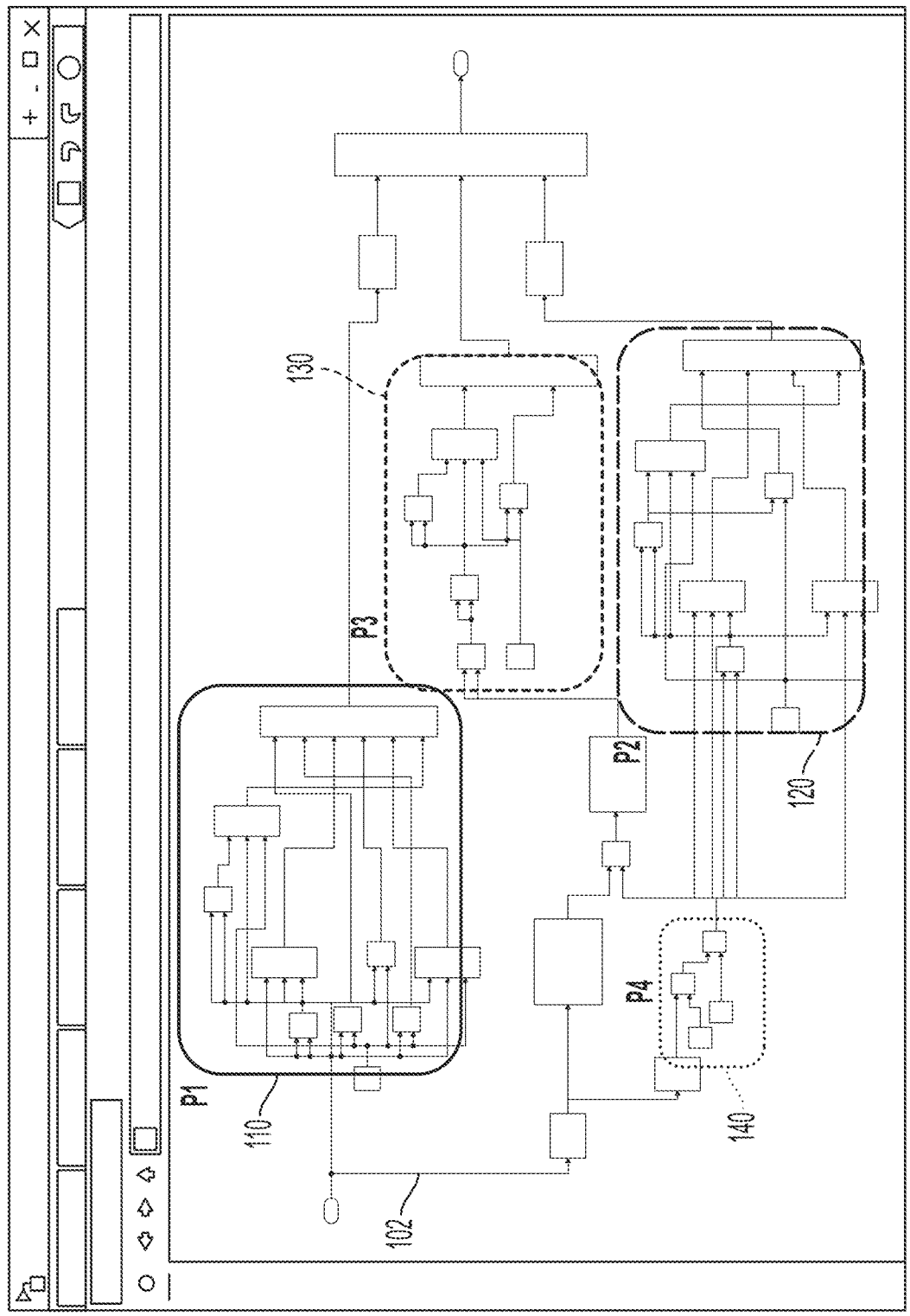
FIG. 1 depicts an exemplary model in a modeling environment where the model includes multiple patterns.

The features and advantages of the present invention will become more apparent from the detailed description set forth below when taken in conjunction with the drawings.

DETAILED DESCRIPTION

The following detailed description refers to the accompanying drawings. The same reference numbers in different drawings may identify the same or similar elements.

Users of modeling environments may use graphical program code to design and simulate complex systems arising in application domains, such as automotive, aerospace, communication engineering, electronics, industrial automation, and other industries. The graphical program code may include one or more models built using graphical affordances, e.g., by connecting blocks, where each block may represent one or more computations. For example, the computations may be associated with operation or behavior of a real-world system in the above application domains or other suitable application domains. Various types of blocks may be used to describe computations that can be performed on application-specific computing hardware, such as a central processing unit (CPU), a graphics processing unit (GPU), an application-specific integrated circuit (ASIC), a microcontroller, a field-programmable gate array (FPGA), and custom hardware. The graphical program code may be converted into textual program code executable in a target environment. For example, the graphical program code can include a model of a control system for an automobile, an aircraft, a satellite, an industrial equipment, or another suitable real-world system which may be converted into textual program code to be deployed in an embedded system in the real-world system.

The modeling environment may provide access to one or more software libraries including blocks and/or patterns of blocks representing computations that are executable in the modeling environment. In some examples, a pattern of blocks can be a group of blocks arranged by connections to provide a computation functionality that often times a single block cannot provide. A pattern of blocks can be used as part of a model, e.g., a component or a subsystem of a model. The blocks and patterns can be repeatedly used, e.g., in multiple instances, in a single model or in different models. In some implementations, multiple blocks or multiple patterns of blocks are provided for a single computation functionality. In some implementations, a user may construct a pattern of blocks that does not yet exist in a library for a computation functionality that already exists in the library, e.g., provided by different library pattern(s) or a computation functionality that is not provided in the library. Sometimes such multiple blocks or multiple patterns of blocks, whether in a library or constructed by a user, can be considered as semantically equivalent, but structurally and/or syntactically different.

The inventors have recognized that, using the different semantically equivalent patterns in the same modeling context can render different performance metric outcomes. This difference can be rendered due to, for example, particular simulation compiler or solver or engine configurations or features, and hardware target features. A modeling context (also referred to as context in this disclosure) may specify parameters for analyzing or executing a pattern. A modeling context for a pattern, in some implementations, can include information about inputs/outputs to the pattern (e.g., value ranges, datatypes, number of and inputs/outputs, sample time, tasks) and/or a given target platform, architecture, technology, or another suitable target for the pattern. Performance metrics (also referred to as metrics in this disclosure) may specify dimensions for measuring performance of the pattern. Performance metrics, in some implementations, can include model metrics independent of a target platform (e.g., a number of blocks, style guides (e.g., MAB check issues), and high integrity check issues) and code metrics dependent on the target platform (e.g., code efficiency metrics, including global variable size, stack size, read/write accesses, data copy performance, binary code size, and worst case execution time, and code style metrics, including complexity violation, readability violation, traceability violation, safety precaution violation, and/or MISRA compliance). Style guides, including MAB check issues, may specify a number of violations of advisory rules or regulatory guidelines, such as those published by the MathWorks Advisory Board (MAB) committee. High integrity check issues may specify a number of violations of guidelines for high level of dependability, including high levels of safety, security, reliability, and/or performance. In some embodiments, the metrics to be used may be selected based on static and/or program analysis. For example, model metrics may be selected based on static analysis. In another example, MISRA violations may be selected based on analysis of the generated code.

The inventors have recognized that while these libraries of patterns and/or user created patterns may represent a great reuse opportunity for users, they can pose a great challenge to some users when they have to determine which pattern from a library to use. For example, a software library may include semantically equivalent, e.g., identical, alternatives to a given pattern. The semantically equivalent alternative patterns may perform the same computation functionality or even in some situations, produce the same numerical result as the given pattern, but may be syntactically and/or structurally different from the given pattern. To effectively use such a software library or user created patterns, in addition to the semantic meaning of the patterns, performance metric data (also referred to as metric data in this disclosure) associated with each pattern under each context can help a user select a pattern for desirable modeling usage. Additionally, a modeling environment can take advantage of the performance metric data and automatically provide pattern refactoring suggestions or automatically refactor to allow users to model systems with the desired performance.

The inventors have appreciated that, in some situations, a model's maintainability may be negatively affected due to an unnecessary increase in size of the program code and even functional correctness and simulation speed may be compromised, when compared to using well-tested pattern functionality which can be more mature and efficient. To address this, the inventors have proposed analyzing semantically equivalent patterns for a given pattern in a modeled system and providing metric data information to the user to help choose one or more of the analyzed patterns. Additionally or alternatively, the modeling environment may automatically detect semantically equivalent patterns for a given pattern and, based on generated metric data information, provide the information to the user for review, determine alternative patterns and recommend them to the user, and/or automatically replace the given pattern with an alternative pattern with or without a user's knowledge. In some implementations, a new library pattern for a new or existing functionality may be generated based on a user created pattern and its associated metric data may be stored for future use, e.g., reuse, in a model. In some implementations, refactoring may be applied during a model construction phase, a model compilation/execution phase, and/or a code generation phase, with or without user input/knowledge. In some implementations, metric data may be generated for a pattern based on each context by generating code and evaluating the code against the metrics without need for generating code for the entire model in which the pattern is used.

In some embodiments, the generated metric data may be used as a benchmarking mechanism or tool for quantitative analysis of at least a portion of a model. In another example, for a large model, metric data for different portions of the model may be used to improve performance for these portions and subsequently improve the overall model.

In some embodiments, the described systems and methods provide for pre-characterization of patterns in a library and generation of respective metric data for later usage when a user is building a model in the modeling environment. Based on the user's desired objectives, patterns from the library may be rated and provided as suggestions to the user to incorporate in the model. For example, the user may browse a group of patterns in the library with corresponding metric data and select a pattern for use in the model. In another example, for a given model in the modeling environment, a pattern may be automatically detected within a model being constructed or already constructed, and suggestions for one or more alternative patterns with corresponding metric data may be presented to the user based on, e.g., intended use of the model, and e.g., code generation, simulation, verification, and validation.

In some embodiments, a user of the modeling environment may input graphical program code to model a real-world system. At certain points, the user may want to choose a pattern from the library and receive evaluation data for multiple patterns that are semantically equivalent but structurally and/or syntactically different. The user may be offered this information on an input interface. The modeling environment may store these patterns in the library with contexts (e.g., input/output to the patterns), generate code for the patterns in the different contexts, compute metric data, and present the metric data to the user, to allow the user to choose a pattern for the model, or provide recommendations based on the user's objectives. An objective may specify a target for prioritizing one or more metrics over others. An objective, in some implementations, can include computer data memory usage (e.g., RAM), instruction memory usage (e.g., ROM), and execution efficiency/performance (e.g., speed or execution time). For different categories of objectives, one or more metrics may be used to characterize how well the objectives can be met and data for the metrics may be generated and collected for such characterization.

Additionally or alternatively, instead of receiving user inputs, the modeling environment may automatically inspect existing libraries to identify patterns that have alternatives and generate metric data under different contexts to present to the user. For example, the modeling environment may provide suggestions to the user for possible modification and/or replacement of a pattern in the user's model.

In addition to or as an alternative to library metric data generation and pattern usage, one or more patterns may be identified in a model automatically by software, or manually by a user, at one or more locations of the model. For each pattern, metric data for the pattern may be generated, alternative patterns may be generated (e.g., with metric data), and/or the pattern may be saved to a library for future use.

Benefits of the described systems and methods include flexible refactoring options for different purposes, for example, improving model performance (e.g., reducing data copies, reducing ROM usage, reducing dynamic instruction count), improving simulation of the actual physical system, improving the code generated (e.g., code performance on embedded systems), improving code compliance to one or more standards (e.g., MISRA), and satisfying high integrity checks.

While aspects of the systems and methods herein are described with respect to graphical program code, the systems and methods described herein may be equally applicable to textual program code, a combination of graphical and textual program code, or another suitable means for inputting code into the modeling environment. Moreover, while aspects of the systems and methods herein are described with respect to code generation from graphical models, the systems and methods described herein may be equally applicable to code generation, simulation, verification, and validation from suitable code input into the modeling environment.

The terms "code," "program," "program code," and/or "programming code," as used herein, are to be used interchangeably and are to be broadly interpreted to include textual program code, graphical program code, or a combination of textual and graphical program code. Textual program code can include text-based code (e.g., Ada, Basic, JAVA, C, C++, C#, FORTRAN, Python, Julia, or assembly language code; Hardware Description Language (HDL) code, very-high-speed integrated circuits (VHSIC) HDL (VHDL) code, VERILOG, SystemC and/or other types of hardware or software based code that may be compiled and/or synthesized); binary code that may be executed (e.g., executable files that may directly be executed by an operating system, bitstream files that can be used to configure a field-programmable gate array (FPGA), JAVA byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, textual program code may include different combinations of the above-identified classes (e.g., text-based code, binary code, text files, etc.). Alternatively, or additionally, textual program code may include code in a programming language that supports dynamic typing (e.g., the M language, a MATLAB® language, a MATLAB-compatible language, a MATLAB-like language, Julia, etc.) that can be used to express problems and/or solutions in mathematical notations or another suitable notation. Graphical program code may include models built connecting graphical blocks, where each block may represent an object associated with functionality and/or data. Blocks may be hierarchical in the sense that each block itself may be implemented as one or more blocks. A user may, for instance, view the model at a high level, then select blocks to drill down into the model to see increasing levels of model detail. Graphical program code may include textual program code. For example, a user may provide custom textual code in a block or a graphical model. Graphical program code may be directly converted into textual program code executable in a target environment. For example, graphical program code can include a model of a control system for an automobile, which may be implemented in textual program code deployed in an embedded system in the automobile. Modeling environments for generating exemplary graphical program code include Simulink®, Stateflow®, SimEvents™, etc., by The MathWorks, Inc.; VisSim by Visual Solutions: LabView® by National Instruments; Dymola by Dassault Systèmes: SoftWIRE by Measurement Computing: WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence: Rational Rose from IBM; Rhopsody or Tau from Telelogic; Ptolemy from the University of California at Berkeley; Agilent VEE by Agilent Technologies; Advanced Design System (ADS) by Agilent Technologies; Agilent Ptolemy by Agilent Technologies; SCADE Suite by Ansys; ASCET, CoWare, or aspects of a Unified Modeling Language (UML) or SysML environment.

Overview

In some aspects, the described systems and methods provide for a modeling environment where metric data for patterns is provided in the modeling environment. While metric data and patterns are described herein with respect to a modeling environment, the metric data and patterns may be available outside a modeling environment. The metric data and the patterns can, for example, be stored into a file that can be transferred between different modeling environments or code generation environments. The generation or creation of graphical program code may be accomplished using a modeling environment, for example, being executed by system 600 of FIG. 6. In the modeling environment, graphical program code for a model may be represented schematically as a collection of patterns interconnected by lines. Each pattern may be defined as a collection of two or more blocks representing computations executable in the modeling environment and associated with operation or behavior of a real-world system.

For a given pattern, the system may construct multiple contexts for generating metric data for the pattern. For example, the context may include information about inputs and/or outputs to the pattern, e.g., value ranges, datatypes, and number of inputs/outputs, and/or a given target platform, architecture, technology, or another suitable target for the pattern. The metric data may be associated with one or more objectives with which the use of the pattern is associated.

The system may construct one or more contexts for generating metric data for a pattern, generate textual code, e.g., C or C++ code, for the pattern under each context, and generate metric data, by executing the generated code, statically analyzing the generated code, or a combination of static and dynamic analysis, for the pattern under each context, e.g., input and/or output to the pattern. The system may generate code for each pattern under the different contexts. In some cases, the same pattern in different contexts can generate different textual code. For example, data type changes in different contexts can provide different metric data for the same pattern. For example, for an add operation in a library, a pattern including the add operation can implement single precision or double precision or integer or fixed point data types. If the datatype switch results in a similar output (e.g., within a tolerance threshold), the add operation can be made faster and/or use fewer resources using the single precision data type. In this case, relevant metric data may include global variable size, stack size, data copies, and ROM usage. For example, in the presence of particular rounding and overflow modes, there may be different logic generated affecting these metrics.

The system may generate metric data by executing or analyzing the code. The metric data may include computer memory usage data, complexity data, compliance violation data, etc. The metric data of the pattern under each context may be associated with one or more objectives with which the use of the pattern is associated, e.g., improving an aspect of the code, such as computer memory usage, execution efficiency, execution performance, etc. Execution efficiency may refer to memory usage (e.g., RAM or ROM) where data copies in generated code are minimized. Execution performance may refer to speed of executed code and/or utilization of target cores. The metric data and the association may be used to provide information about the metric data or information based on the metric data when the pattern is to be used or is used in a model representing the real-world system. This information may help the users of the modeling environment avoid reimplementing general purpose functionality for which well-tested, mature pattern functionality already exists.

FIG. 1 depicts an interface 100 for a modeling environment where metric data for patterns can be generated and provided to a user. The generation or creation of the patterns illustrated in FIG. 1 is accomplished, for example, using system 600 of FIG. 6. One example of a modeling environment is Simulink® from The MathWorks, Inc. of Natick, Mass. Each pattern may be defined as a collection of two or more blocks representing computation functionalities and associated with operation or behavior of a real-world system. These patterns and respective metric data may be stored in memory in a software library or another suitable repository. For example, respective metric data for each pattern may be generated prior to use in a model in the modeling environment. The metric data or information based on the respective metric data may be provided when one of the patterns is to be used in the model. In another example, respective metric data for each pattern may be generated dynamically or on demand, e.g., when the pattern is constructed during model editing or construction, or when those patterns in the library that do not yet have metric data generated, are being considered for use in a model in the modeling environment.

For each pattern in the library or being considered for metric data generation, the system may construct multiple contexts for generating multiple sets of metric data for the pattern. The context may include information about input and/or output to the pattern, e.g., value ranges, datatypes, and number of inputs/outputs, and/or a given target platform, architecture, technology, or another suitable target for the pattern. The metric data may be used for evaluating how well one or more objectives, with which the use of a pattern is associated, can be achieved by using the pattern under a given context. The system may then generate code for the pattern under each context. Generally, the generated code is different from the program code in which the pattern is constructed. For example, the pattern can be a graphical code, textual code, or a combination of textual and graphical code, and the generated code may be textual code such as C, C++, Perl, VBscript, JavaScript, tlc, the technical computing programming language of MATLAB®, the hardware description language of HDL, or another suitable language. One ordinarily skilled in the art will recognize the various types of languages the code generation tools, e.g., Embedded Coder®, TargetLink®, QGen® from AdaCore®, and other code generation tools, may apply in generating code.

The system may generate metric data for the pattern under each context, e.g., by executing the code generated for each pattern using input/output from the current context, statically analyzing the generated code, or a combination of static and dynamic analysis. The metric data may include computer memory usage data, complexity data, and/or compliance violation data. The system may associate the metric data of the pattern under each context with the objectives, e.g., computer memory usage, execution efficiency, and/or execution performance. The system may store the metric data and the association for use in providing information about the metric data or information based on the metric data when the pattern is to be used or is used in a model representing the real-world system.

The metrics may include model metrics, which are independent of the target platform for the generated code, and/or code metrics, which are dependent on the target platform. In some embodiments, the same code may have different performance metrics depending on the platform/architecture. For example, performance metrics for the same code may be dependent on the number of cores and/or threads provided by the target platform. In such cases, while some code metrics may be dependent on the target platform, other code metrics may not be dependent on the target platform. In an illustrative example, the model metrics may include a number of blocks, MathWorks Advisory Board (MAB) check issues, and/or high integrity check issues. The MAB check issues may relate to one or more of configuration settings, modeling patterns, use of subsystems, signal names, or state flow designs, state transition diagrams, or control flow designs. The code metrics may include code efficiency metrics and/or code style metrics. For example, the code efficiency metrics may include global variable size, stack size, read/write accesses, data copy performance, and/or binary code size. For example, the code style metrics may include complexity violation, readability violation, traceability violation, safety precaution violation, and/or coding standard compliance, e.g., MISRA compliance. For example, complexity violations may relate to cyclomatic complexity of a function (e.g., number of branches or conditions) or Halstead metrics (e.g., number of operators/operands). For example, a readability violation may relate to identifiers having a defined maximum length. If the defined maximum length is 12, then "int myName" is not a violation as myName is six characters, but "int myNameIsVeryLong" is a violation as myNameIsVeryLong is 16 characters long. MISRA-C is an exemplary coding standard for C code created by the Motor Industry Software Reliability Association (MISRA) that can be applied to the patterns in the illustrative embodiment. One of ordinary skill in the art will appreciate that the modeling environment may include any other coding standards, for example, QAC, EC++, and Spark.

In FIG. 1, a model 102 is constructed or is being constructed in a modeling environment 100. In one embodiment, semantically equivalent patterns can be identified, e.g., by the modeling environment, when the model is constructed or after the model is constructed. The identification can be based on analysis of the model or can be based on user's usage of an existing library from which semantically equivalent patterns have been instantiated and used in one or more parts of the model. In some embodiments, semantically equivalent patterns can be identified using numerical approximation methods where a pattern may be sufficiently close to another pattern to be equivalent, given a numerical tolerance. In some embodiments, determining semantically equivalent patterns may include determining semantic clones and/or approximate clones. For example, semantic clones may be determined from their canonical form representation, where different block connects tantamount to the same mathematical equations. In another example, approximate clones may be determined based on properties including blocks, parameters, and connectivity. If two regions/subsystems match each other within a certain tolerance based on the properties above, they can be considered to be approximate clones.

In the example shown in FIG. 1, patterns P1, P2, P3, and P4 are identified to be semantically equivalent but syntactically and/or structurally different. For example, the different patterns may have the same semantics as identified below:

$P1: (x-1) \times (x+1) \times (x^2+x+1) \times \ldots \times (x^2+1) \times (x^2+1) \times (x^2-x+1) \times (x^4-x^2+1)$, $P2: (x^4-1) \times (x^2+x+1) \times \ldots \times (x^2-x+1) \times (x^4-x^2+1)$, $P3: (x^4-1) \times (x^8+x^4+1)$, $P4: x^{12}-1$, where x represents input to each pattern 110, 120, 130, and 140.

For each pattern, the system may retrieve or determine one or more contexts, (C1, C2, C3, C4, . . . ). For example, the contexts can include different data types for the input/output to the pattern, e.g., {C1=x has double datatype, C2=x has single datatype, . . . }.

The system may generate code as described above for each pattern per context. For example, the set of generated code may include {{P1, {C1, C2, . . . }}, {P2, {C1, C2, . . . }}, {P3, {C1, C2, . . . }}, {P4, {C1, C2, . . . }}, . . . }. In other words, for each pattern, K sets of code can be generated where K represents the total number of contexts for the pattern. The total number of sets of code generated for all the patterns may be determined based on the number of patterns and the number of different contexts for each pattern. For the four patterns identified in FIG. 1, two contexts are used to generate eight sets of code. In particular, the two contexts for each pattern include a first context with a double data type and a second context with a single data type.

For example, for pattern P1, the first context with a double data type is used to generate the code shown below.

```
real_T ObjectivePatternSelection_P1_Lib(real_T rtu_In1)
{
  real_T rtb_Product;
  /* Product: '<S3>/Product' */
  rtb_Product = rtu_In1 * rtu_In1;
  /* Product: '<S3>/Product2' incorporates:
  * Constant: '<S3>/Constant4'
  * Product: '<S3>/Product1'
  * Sum: '<S3>/Sum'
  * Sum: '<S3>/Sum1'
  * Sum: '<S3>/Sum2'
  * Sum: '<S3>/Sum3'
  * Sum: '<S3>/Sum4'
  * Sum: '<S3>/Sum5'
  */
  return (rtu_In1 – 1.0) * (rtu_In1 + 1.0) * ((rtb_Product + rtu_In1) +
  1.0) * (rtb_Product + 1.0) * ((rtb_Product – rtu_In1) + 1.0) * ((rtb_
  Product * rtb_Product – rtb_Product) + 1.0);
}
```

In another example, for pattern P1, the second context with a single data type is used to generate the code shown below.

```
real_T ObjectivePatternSelection_P1_Lib(real32_T rtu_In1)
{
  real32_T rtb_Product;
  /* Product: '<S3>/Product' */
  rtb_Product = rtu_In1 * rtu_In1;
   /* Product: '<S3>/Product2' incorporates:
   * Constant: '<S3>/Constant4'
   * Product: '<S3>/Product1'
   * Sum: '<S3>/Sum'
   * Sum: '<S3>/Sum1'
   * Sum: '<S3>/Sum2'
   * Sum: '<S3>/Sum3'
   * Sum: '<S3>/Sum4'
   * Sum: '<S3>/Sum5'
   */
   return (rtu_In1 – 1.0) * (rtu_In1 + 1.0) * (((real_T)rtb_Product +
   rtu_In1) + 1.0) * (rtb_Product + 1.0) * (((real_T)rtb_Product – rtu_
   In1) + 1.0) * (((real_T)(rtb_Product * rtb_Product) – rtb_Product) +
   1.0);
}
```

In some embodiments, the presentation of the metric data for each pattern can be objective dependent. Similarly, the automatic selection of metric data and pattern by the modeling environment or system, if not presented to the user, can be objective dependent. As the metric data can have many entries, in some embodiments, only selected metric data is presented. The objective of using the pattern may determine a presentation order of the metrics. The ordering may be used to select the pattern per context. The ordering may be tied to one or more objectives by assigning corresponding weights (e.g., in a relative priority selection ordering) or choosing the pattern with the best metric (e.g., in an absolute priority selection). For example, using relative priority selection ordering, the weights may be associated to the corresponding objectives, e.g., RAM usage reduction, and the metrics associated with the objectives may be minimized, e.g., RAM (stack/global) size. In another example, if Global RAM reduction and data copy reduction are two objectives under consideration in the decreasing order of priority, the assigned weights may be 60% and 40% respectively, and the objective function may be represented as follows:

Objective function: minimize 0.6*number of globals+0.4*number of data copies.

In an example, using absolute priority selection ordering, the pattern (per context) with the minimum number of globals may be selected. If the number of globals is the same for two patterns, the pattern with the minimum number of data copies may be selected.

In some embodiments, the ordering may be an absolute priority ordering following a pseudocode based approach outlined below:
1. Collect values for one or more objectives (e.g., numerical values of metrics, such as number of lines of code, number of MISRA check violations, etc.) for each pattern and arrange them according to the priority of objectives.
2. Compare values of a first objective for each pattern and sort the patterns for the values in increasing order.
3. Check if there is more than one pattern for the lowest value of the first objective.
   a. If Yes, then arrange the patterns for values of a second objective in increasing order, only for the patterns where values of the first objective are the same.
   b. If No, then the pattern with a minimum value of the first objective is the preferred pattern.
4. Repeat steps 2 through 3 till a pattern is selected.

In some embodiments, the ordering may be a relative priority ordering following a pseudocode based approach outlined below:
1. Assign different weights, $w_i$, to the objectives, obj(i), select a pattern that minimum of such that
Weighted Objective = $(w_1 * obj_1 + w_2 * obj2 + w_n * objn)$
$w_1 + w_2 + ... w_n = 1$ and
$w_1 > w_2 > ... > w_n$ The objectives are ordered in priority and i indexes into the objective set. The values of $w_i$ are provided by the user. The $Obj_i$ values for each objective are collected for each pattern.
2. For each pattern, compute the "Weighted Objective" value according to the above formula.
3. Select the pattern that has a minimum value for the "Weighted Objective."

Figure 2:
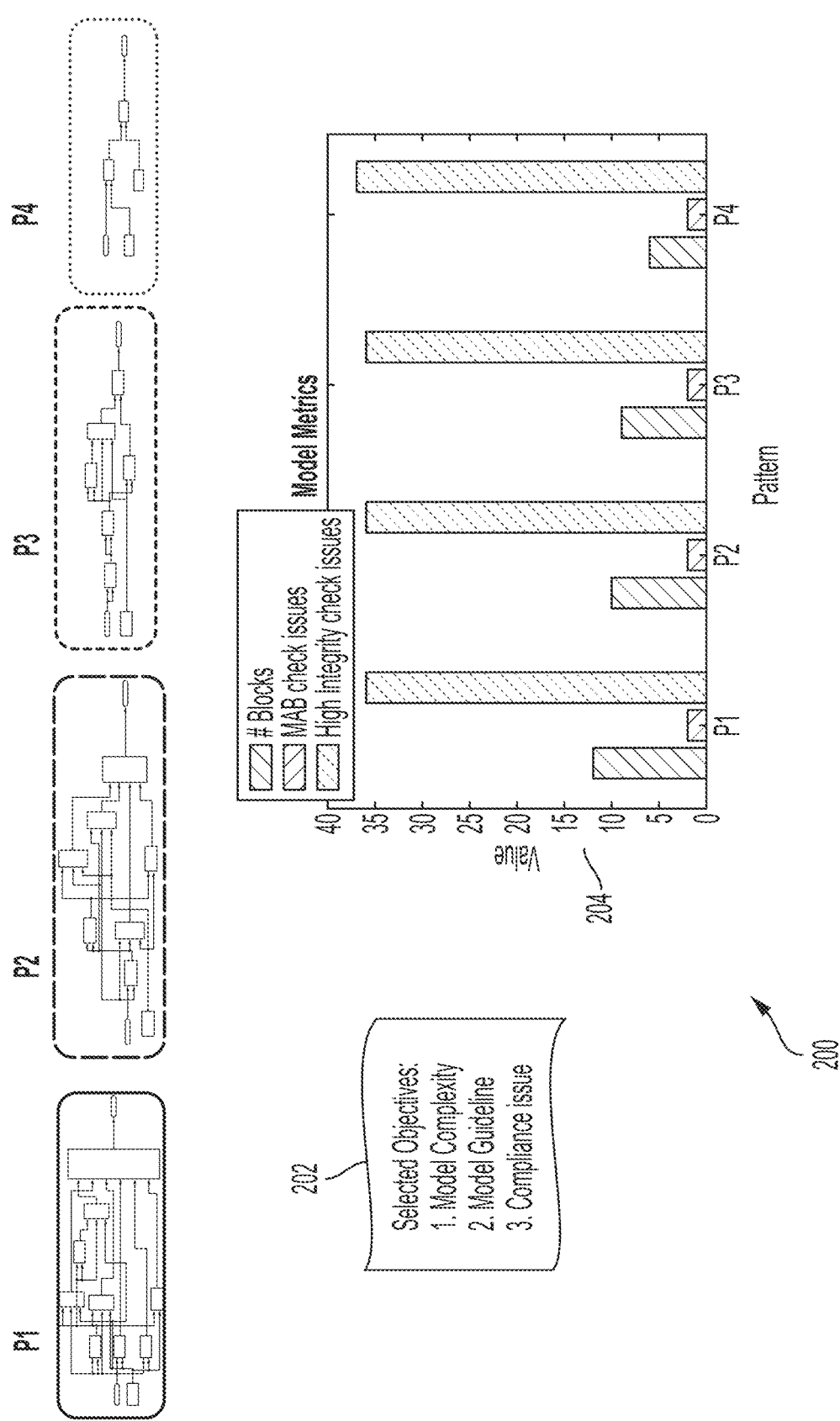
FIG. 2 depicts exemplary metric data for patterns in a modeling environment.

FIG. 2 depicts an interface 200 associated with or independent of a modeling environment where metric data for patterns is provided. In this example, patterns, P1, P2, P3, and P4 of FIG. 1, which are semantically equivalent but syntactically and/or structurally different, are presented to the user and compared using selected objectives 202. The patterns may be retrieved from a software library or another suitable repository, or may be extracted/identified from a model that is being constructed or has been constructed as shown in FIG. 1. The patterns are considered per context, e.g., a context with a double data type or another suitable context. In some embodiments, at least some metric data may be pre-calculated and retrieved from the software library, as well as, at least some metric data may be determined when the user requests the metric data for the patterns, or a combination thereof. In particular, the interface 200 includes selected objectives 202, e.g., selected by a user or another suitable source, including model complexity, model guidelines, and compliance issues. These objectives are ordered by priority in FIG. 2. At least some objectives may be provided by the user, at least some may be automatically selected, e.g., using deep learning or another suitable technique, or a combination thereof. In graph 204, metric data for the patterns is presented, including metric data for number of blocks, MAB check issues, and high integrity check issues. The MAB check issues may include checking signal line labels (e.g., to identify blocks that require labeled signals), checking MATLAB function metrics (e.g., to identify functions that violate complexity limits), and checking model description (e.g., to identify layers in the model having inconsistent description format). The high integrity check issues may include checking usage of gain blocks (e.g., to identify gain blocks with a value which resolves to 1), checking safety-related diagnostic settings for saving (e.g., to check diagnostic settings in model configuration that apply to saving model files), and checking for model elements that do not link to requirements (e.g., to identify model elements that do not link to a requirement document).

The user of the modeling environment may review the presented information to determine which pattern to choose for their model. Additionally or alternatively, a pattern may be recommended to the user. In FIG. 2, the selected objectives in order of priority are model complexity, model guidelines, and compliance issues. The information relating to the complexity objective is captured by the metric data for number of blocks. The number of blocks for the pattern may be determined using a function, such as the SLDIAGNOSTICS function provided in Simulink®, or another suitable function. The information relating to the model guidelines objective is captured by the metric data for MAB check issues. The MAB check issues for the pattern may be determined as described above. The information relating to the compliance issues objective is captured by the metric data for high integrity check issues. The high integrity check issues for the pattern may be determined as described above. In some embodiments, dependent on the context, different datatypes can lead to more or less casting operations in the generated code. For example, the casting operations may result in different MISRA Compliance metrics.

Based on absolute priority selection, for example, pattern P4 may be the highest ranked choice from the four patterns and may be recommended to the user. In FIG. 2, the objectives are ordered by priority with model complexity being highest and compliance issues being lowest. The values of the corresponding metric data for the model complexity objective, e.g., number of blocks, for each pattern may be collected and sorted in increasing order. For example, the sorted values may be six blocks for pattern P4, eight blocks for pattern P3, 10 blocks for pattern P2, and 12 blocks for pattern P1. Because there is only one pattern, P4, with the lowest value, pattern P4 is selected as the recommended pattern for the user. In some embodiments, if any pattern and/or its metric data is not stored in a library, the system can save the pattern, the context, and/or the metric data to the library for future usage.

Figure 3:
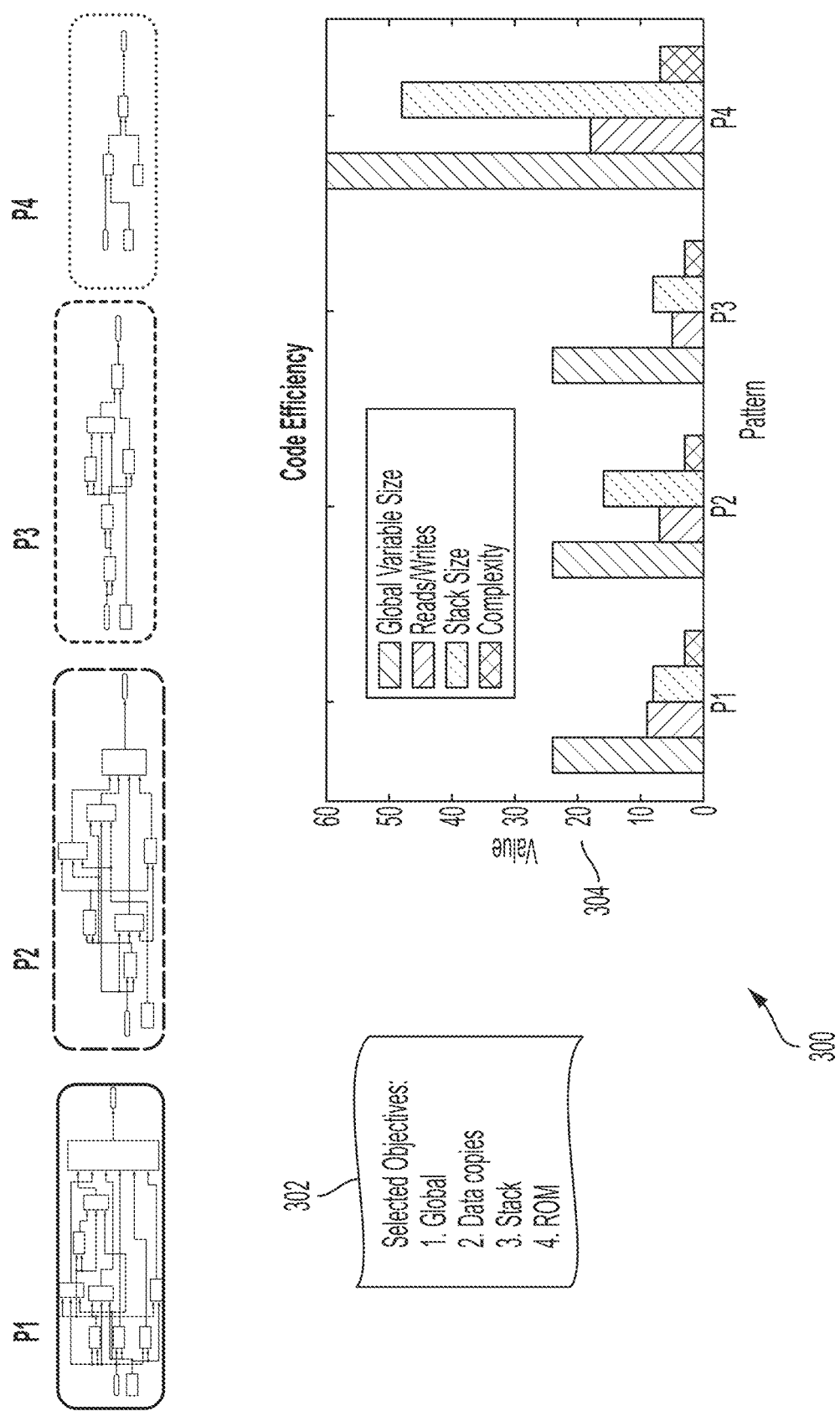
FIG. 3 depicts another exemplary metric data for patterns in a modeling environment.

FIG. 3 depicts an interface 300 for a modeling environment where metric data for patterns is provided in the modeling environment. In this example, patterns P1, P2, P3, and P4 described above are presented to the user and compared using selected objectives 302. The patterns may be retrieved from a software library or another suitable repository, or may be extracted/identified from a model that is being constructed or has been constructed as shown in FIG. 1. The patterns are considered per context, e.g., a context with a double data type or another suitable context. In particular, the interface 300 includes selected objectives 302, e.g., selected by a user or another suitable source, including global, data copies, stack, and ROM. These objectives are ordered by priority in FIG. 3. At least some objectives may be provided by the user, at least some may be automatically selected, e.g., using deep learning or another suitable technique, or a combination thereof. In graph 304, metric data for the patterns is presented, including metric data for global variable size, reads/writes, stack size, and complexity.

The user of the modeling environment may review the presented information to determine which pattern to choose for their model. Additionally or alternatively, a pattern may be recommended to the user. In FIG. 3, the selected objectives in order of priority are global, data copies, stack, and ROM. The information relating to the global objective is captured by the metric data for global variable size. The information relating to the data copies objective is captured by the metric data for reads/writes. The information relating to the stack objective is captured by the metric data for stack size. The information relating to the ROM objective is captured by the metric data for complexity. The metric data may be obtained using a function within or external to the modeling environment or by another suitable means.

Based on absolute priority selection, for example, pattern P3 may be the highest ranked choice from the four patterns and may be recommended to the user. In FIG. 3, the objectives are ordered by priority with global being highest and ROM being lowest. The values of the corresponding metric data for the global objective, e.g., global variable size, for each pattern may be collected and sorted in increasing order. For example, the sorted values may be global variable size 24 for patterns P1, P2, and P3, and global variable size 60 for pattern P4. Because there are three patterns, P1, P2, and P3, with the lowest value, pattern P4 is excluded and values of corresponding metric data for the next objective in priority, data copies, are collected. The values of the corresponding reads/writes metric data for each pattern are collected and sorted in increasing order. For example, the sorted values may be four reads/writes for pattern P3, six reads/writes for pattern P2, and eight reads/writes for pattern P1. Because there is only one pattern, P3, with the lowest value, pattern P3 is selected as the recommended pattern for the user. In some embodiments, if any pattern and/or its metric data is not stored in a library, the system can save the pattern and/or the metric data to the library for future usage.

Figure 4:
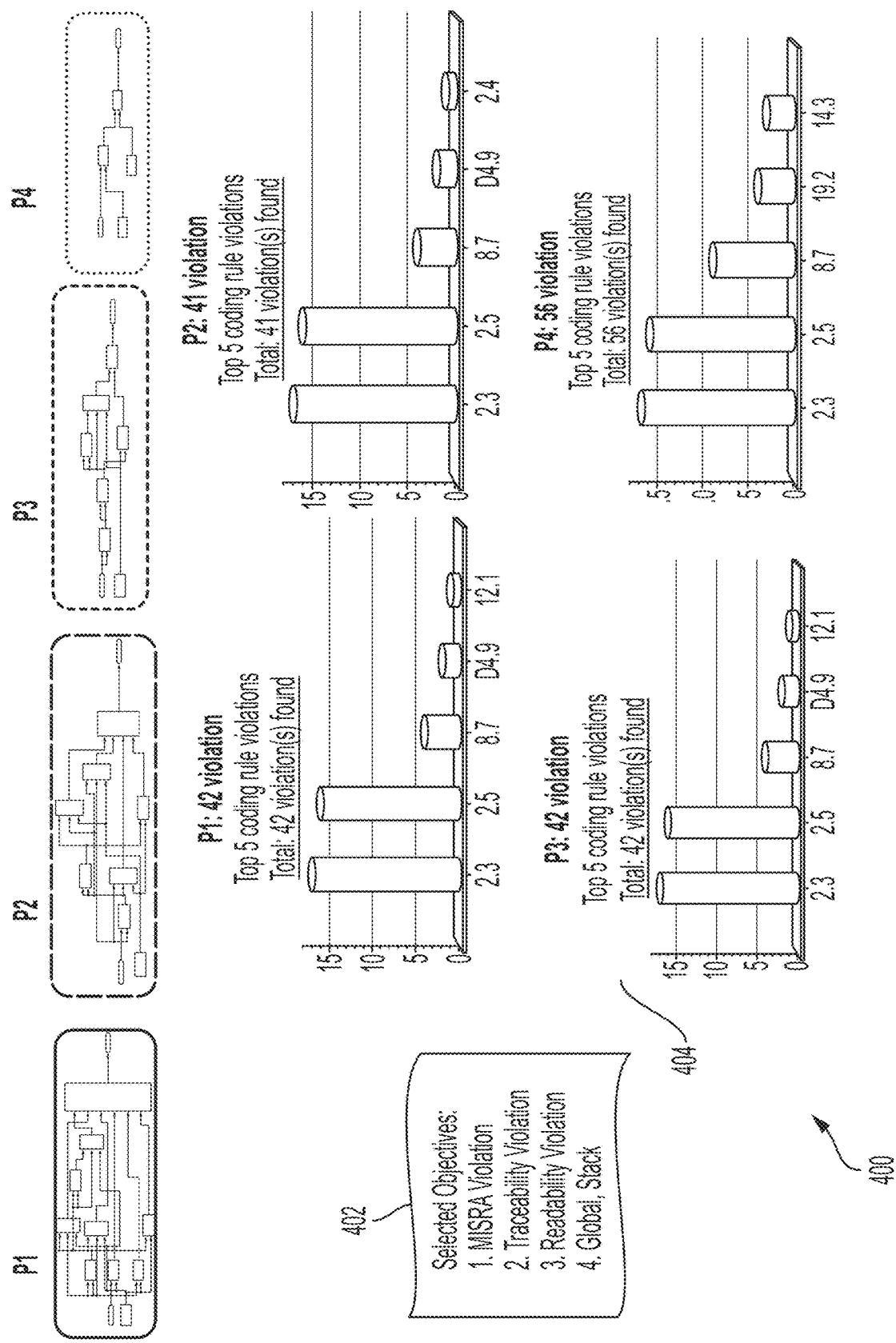
FIG. 4 depicts yet another exemplary metric data for patterns in a modeling environment.

FIG. 4 depicts an interface 400 for a modeling environment where metric data for patterns is provided in the modeling environment. In this example, patterns P1, P2, P3, and P4 described above are presented to the user and compared using selected objectives 402. The patterns may be retrieved from a software library or another suitable repository, or may be extracted/identified from a model that is being constructed or has been constructed as shown in FIG. 1. The patterns are considered per context, e.g., a context with a double data type or another suitable context. In particular, the interface 400 includes selected objectives 402, e.g., selected by a user or another suitable source, including MISRA violations, traceability violations, readability violations, global, and stack. The MISRA violations may include illegally dereferenced points, non-initialized local variables, non-initialized pointers, and non-initialized variables. These objectives are ordered by priority in FIG. 4. At least some objectives may be provided by the user, at least some may be automatically selected, e.g., using deep learning or another suitable technique, or a combination thereof. In graph 404, metric data for the patterns is presented, including metric data for coding rule violations. The MISRA violation metrics may be context dependent.

The user of the modeling environment may review the presented information to determine which pattern to choose for their model. Additionally or alternatively, a pattern may be recommended to the user. In FIG. 4, the selected objectives in order of priority are MISRA violations, traceability violations, readability violations, global, and stack. The corresponding metric data may be obtained using a function within or external to the modeling environment or by another suitable means. For example, based on absolute priority selection, pattern P2, having the lowest number of violations, may be the highest ranked choice from the four patterns and may be recommended to the user.

The inventors have appreciated that depending on the objectives and their priority order, different patterns may be recommended to the user. For example, in FIG. 2, based on the objectives and their priority order, pattern P4 may be recommended, while in FIG. 3, based on different objectives and their priority order, pattern P3 may be recommended, and in FIG. 4, based on yet other objectives and their priority order, pattern P2 may be recommended. In some embodiments, if any pattern and/or its metric data is not stored in a library, the system can save the pattern and/or the metric data to the library for future usage.

Example Environment Arrangement

Figure 5:
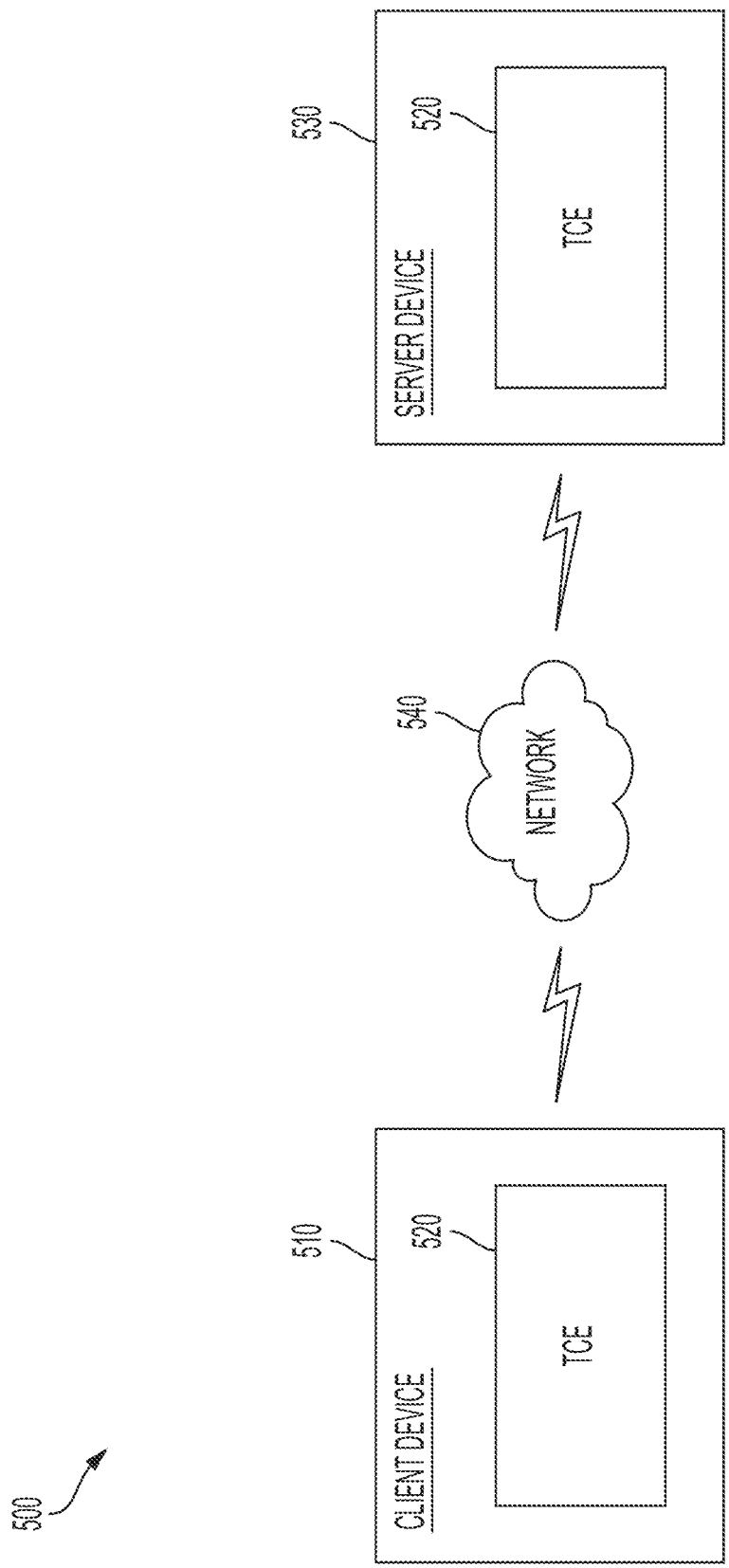
FIG. 5 depicts an exemplary environment in which systems and/or methods described herein may be implemented.

FIG. 5 is a diagram of an example environment 500 in which systems and/or methods described herein may be implemented. As shown in FIG. 5, environment 500 may include a client device 510, which may include a technical computing environment (TCE) 520. Furthermore, environment 500 may include a server device 530, which may include TCE 520, and a network 540. Devices of environment 500 may interconnect via wired connections, wireless connections, or a combination of wired and wireless connections.

Client device 510 may include one or more devices capable of receiving, generating, storing, evaluating, and/or providing program code and/or information associated with program code (e.g., a result of evaluating program code). For example, client device 510 may include a computing device, such as a desktop computer, a laptop computer, a tablet computer, a handheld computer, a server, a mobile phone (e.g., a smart phone, a radiotelephone, etc.), or a similar device. Client device 510 may evaluate program code by, for example, executing the program code, determining an error associated with the program code (e.g., by validating the program code, debugging the program code, etc.), determining information associated with the program code (e.g., determining help information associated with the program code), or the like. In some implementations, client device 510 may receive information from and/or transmit information to server device 530 (e.g., program code and/or information associated with program code).

Client device 510 may host TCE 520. TCE 520 may include any hardware-based component or a combination of hardware and software-based components that provides a computing environment that allows tasks to be performed (e.g., by users) related to disciplines, such as, but not limited to, mathematics, science, engineering, medicine, and business. TCE 520 may include a text-based environment (e.g., MATLAB® software), a graphically-based environment (e.g., Simulink® software, Stateflow® software, SimEvents® software, Simscape™ software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; SCADE Suite by Ansys; etc.), or another type of environment, such as a hybrid environment that may include, for example, a text-based environment and a graphically-based environment.

TCE 520 may include, for example, a user interface that provides a modeling environment portion that permits a user to input program code (e.g., textual program code, graphical program code, etc.). Additionally, or alternatively, TCE 520 may include a user interface that provides a code evaluation portion that provides results corresponding to program code displayed in the modeling environment portion. TCE 520 may provide one or more correspondence indicators that indicate a correspondence between different portions of program code and respective results associated with the different portions of program code. TCE 520 may permit a user to input one or more configuration parameters that may control, for example, a manner in which a result is displayed and/or provided, a manner in which program code is displayed and/or provided, a manner in which a correspondence indicator is displayed and/or provided, or the like.

Server device 530 may include one or more devices capable of receiving, generating, storing, evaluating, and/or providing program code and/or information associated with program code. For example, server device 530 may include a computing device, such as a server, a desktop computer, a laptop computer, a tablet computer, a handheld computer, a mobile device, or a similar device. In some implementations, server device 530 may include an embedded device, such as a microcontroller (e.g., an Arduino microcontroller, a device utilizing an ARM architecture, a device utilizing an x86 architecture, etc.). In some implementations, server device 530 may host TCE 520. In some implementations, client device 510 may be used to access one or more TCEs 520 running on one or more server devices 530. For example, multiple server devices 530 may be used to evaluate program code (e.g., serially or in parallel) and may provide respective results of evaluating the program code to client device 510.

In some implementations, client device 510 and server device 530 may be owned by different entities. For example, an end user may own client device 510, and a third party may own server device 530. In some implementations, server device 530 may include a device operating in a cloud computing environment. In this way, front-end applications (e.g., a user interface) may be separated from back-end applications (e.g., program code execution).

Network 540 may include one or more wired and/or wireless networks. For example, network 540 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 5 is provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, one or more of the devices of environment 500 may perform one or more functions described as being performed by another one or more devices of environment 500.

Example Device Architecture

Figure 6:
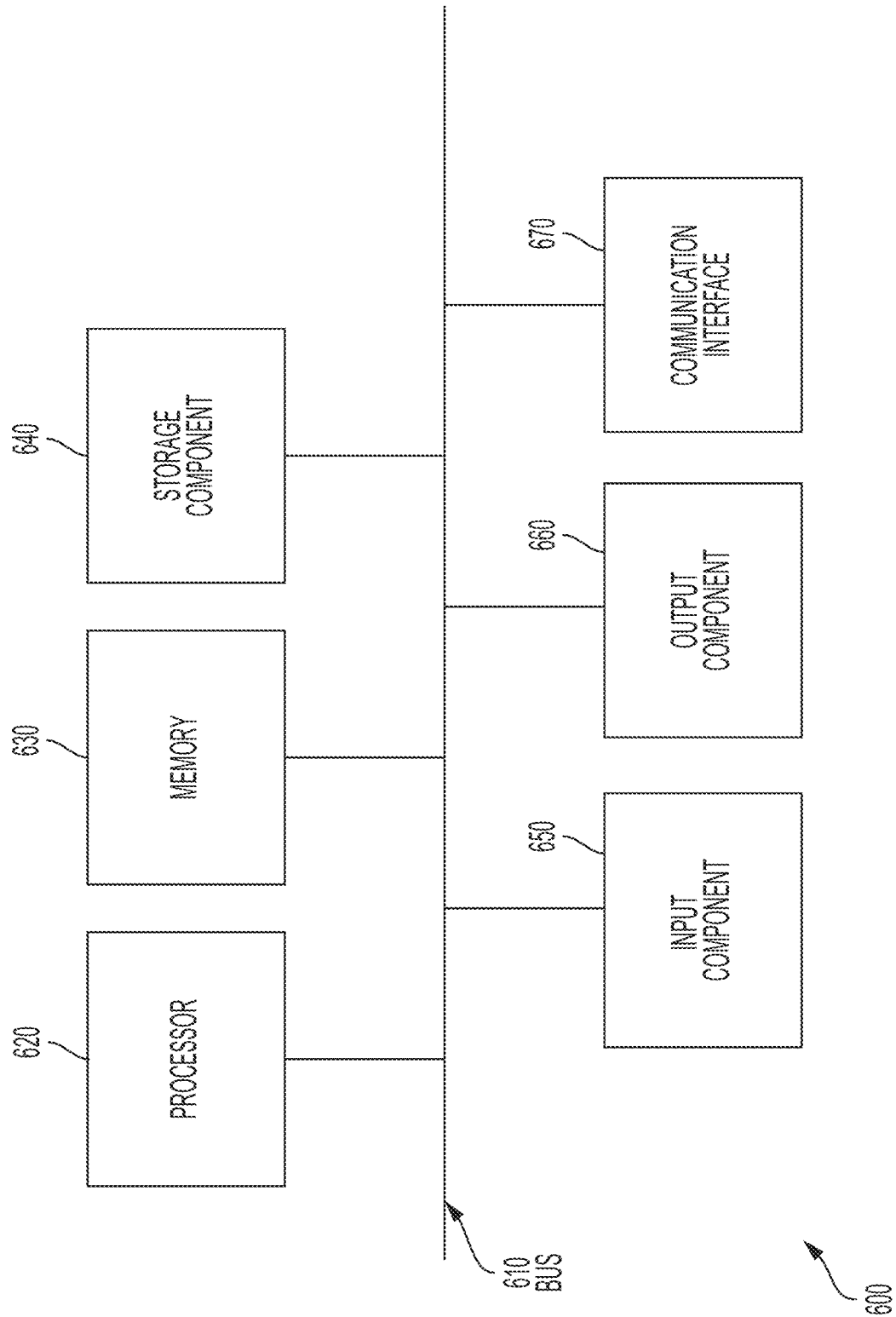
FIG. 6 depicts an exemplary schematic of one or more of the devices of the environment depicted in FIG. 5.

FIG. 6 is a diagram of example components of a device 600, which may correspond to client device 510 and/or server device 530. In some implementations, client device 510 and/or server device 530 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 may include a component that permits communication among the components of device 600. Processor 620 may include a processor (e.g., a central processing unit, a graphics processing unit, an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture, such as ARM, x86, etc.), and/or that is designed to implement one or more computing tasks. In some implementations, processor 620 may include multiple processor cores for parallel computing. Memory 630 may include a random access memory (RAM), a read only memory (ROM), and/or another type of dynamic or static storage component (e.g., a flash, magnetic, or optical memory) that stores information and/or instructions for use by processor 620.

Storage component 640 may store information and/or software related to the operation and use of device 600. For example, storage component 640 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 640 may store TCE 520.

Input component 650 may include a component that permits a user to input information to device 600 (e.g., a touch screen display, a keyboard, a keypad, a mouse, a button, a switch, etc.). Output component 660 may include a component that outputs information from device 600 (e.g., a display, a speaker, one or more light-emitting diodes (LEDs), etc.).

Communication interface 670 may include a transceiver-like component, such as a transceiver and/or a separate receiver and transmitter, that enables device 600 to communicate with other devices, such as via a wired connection, a wireless connection, or a combination of wired and wireless connections. For example, communication interface 670 may include an Ethernet interface, an optical interface, a coaxial interface, an infrared interface, a radio frequency (RF) interface, a universal serial bus (USB) interface, a high-definition multimedia interface (HDMI), or the like.

Device 600 may perform one or more processes described herein. Device 600 may perform these processes in response to processor 620 executing software instructions included in a computer-readable medium, such as memory 630 and/or storage component 640. A computer-readable medium may be defined as a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 6 is provided as an example. In practice, device 600 may include additional components, fewer components, different components, or differently arranged components than those shown in FIG. 6. Additionally, or alternatively, one or more components of device 600 may perform one or more functions described as being performed by another one or more components of device 600.

Figure 7:
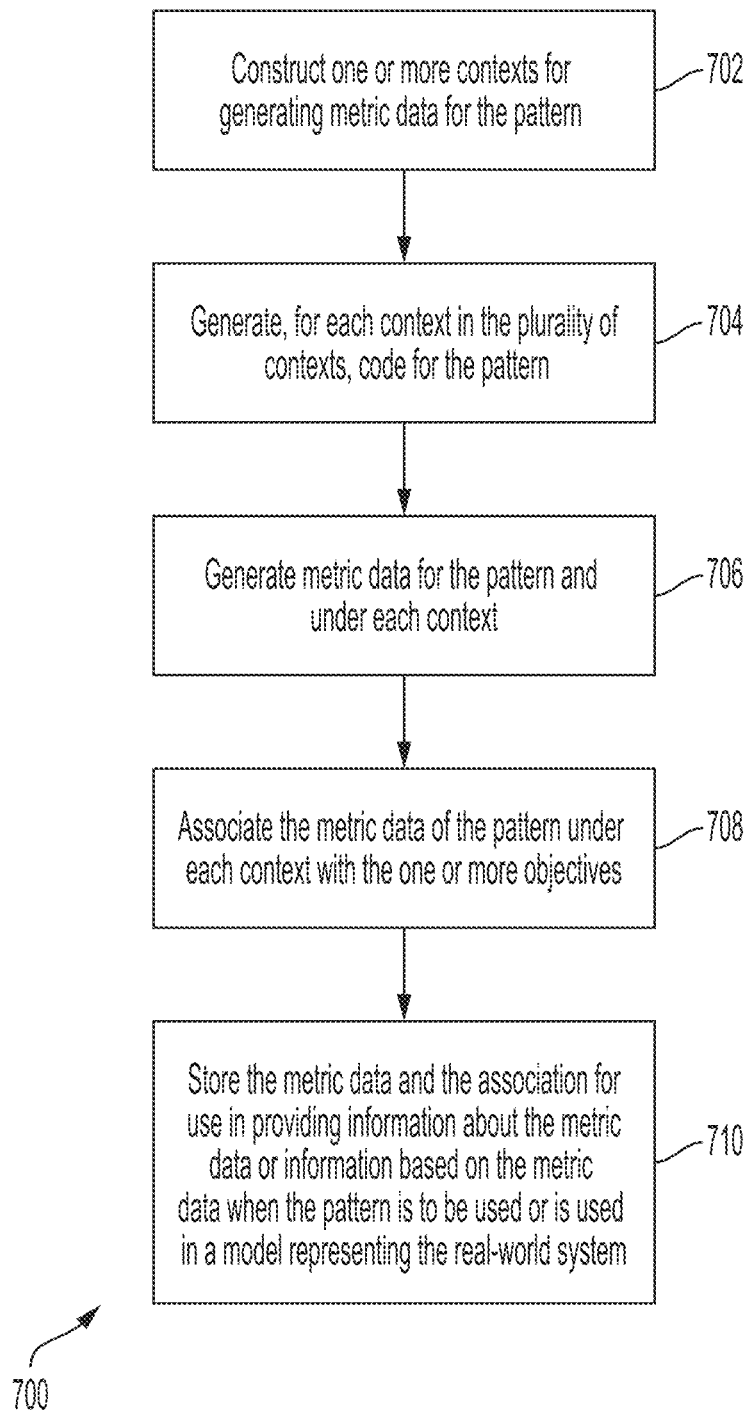
FIG. 7 depicts an exemplary method for implementing an embodiment of the systems and/or methods described herein.

Exemplary Methods for Providing Metric Data for Patterns in a Modeling Environment FIG. 7 depicts an exemplary method 700 for implementing the systems and/or methods described herein. The system may execute this exemplary method on one or more processors in communication with memory to provide metric data for patterns in a modeling environment. For example, method 700 may be executed using system 600 in FIG. 6. The method may be executed for each pattern comprising at least two blocks and representing one or more computations being executable in a modeling environment. The computations may be associated with operation or behavior of a real-world system, e.g., an embedded system in an automobile, an aircraft, a satellite, an industrial equipment, or another suitable real-world system in domains such as automotive, aerospace, communication engineering, electronics, industrial automation, and other industries.

At step 702, the system constructs one or more contexts for generating metric data for a pattern. For example, the pattern may be P1, P2, P3, or P4 from FIG. 1, or another suitable pattern. The contexts are constructed based on the pattern under consideration. For example, possible data types, such as those observed within the pattern, may be used to construct corresponding contexts. In another example, all possible data types within the system may be used to construct corresponding contexts. Each context may include information about input and/or output to the pattern, e.g., value ranges, datatypes, and number of inputs/outputs, and/or and a given target platform, architecture, technology, or another suitable target for the pattern. The metric data may be associated with one or more objectives with which the use of the pattern is associated, e.g., computer memory usage, execution efficiency, and/or execution performance.

At step 704, the system generates code for each pattern according to each context. For example, the system may generate code for C, C++, Ada, Perl, VBscript, JavaScript, tlc, the technical computing programming language of MATLAB®, the hardware description language of HDL, or another suitable language.

At step 706, the system executes or analyzes the code to generate metric data for the pattern under each context, e.g., computer memory usage data, complexity data, and/or compliance violation data. In some embodiments, the code for the pattern is generated based on the objectives and/or priority of the objectives. In some embodiments, the metric data is generated for each pattern and under each context based on a target platform for the code of the pattern. For example, FIGS. 2-4 illustrate different sets of metric data for four semantically equivalent patterns with different objectives in each instance. In particular, using the example of FIG. 2, metric data for a number of blocks, MAB check issues, and high integrity check issues are collected. In some embodiments, the metric data that is generated may be based on specific objectives and/or priority. For example, if there is an absolute ordering for the highest priority metric, there may be no need to generate the metric data for any other objectives. In other words, as soon as a metric is generated that uniquely distinguishes, further metric generation may be stopped.

The metrics may include model metrics and/or code metrics. The model metrics are independent of a target platform. The code metrics may be dependent on the target platform. In some embodiments, the same code may have different performance metrics depending on the platform/architecture. For example, performance metrics for the same code may be dependent on the number of cores and/or threads provided by the target platform. In such cases, while some code metrics may be dependent on the target platform, other code metrics may not be dependent on the target platform. The model metrics may include a number of blocks, MAB check issues, and/or high integrity check issues. The code metrics may include code efficiency metrics and/or code style metrics. The code efficiency metrics may include global variable size, stack size, read/write accesses, data copy performance, and/or binary code size. The code style metrics may include complexity violation, readability violation, traceability violation, safety precaution violation, and/or MISRA compliance.

In some embodiments, respective metric data for the patterns is generated prior to use in a model in the modeling environment. The respective metric data or information based on the respective metric data may be provided when one of the patterns is used or considered for use in the model.

At step 708, the system associates the metric data of the pattern under each context with the objectives. For example, as described with respect to FIG. 2, metric data for a number of blocks relates to the complexity objective, metric data for MAB check issues relates to the model guidelines objective, and metric data for high integrity check issues relates to the compliance issues objective. The system may accordingly associate the different metric data of the pattern with their related objectives.

At step 710, the system stores the metric data and the association for use in providing information about the metric data or information based on the metric data when the pattern is to be used or is used in a model representing the real-world system. In some embodiments, the metric data and the association are stored in a library.

In some embodiments, each pattern is rated based on the objectives and/or priority of the objectives, and ratings for the two or more patterns are provided as suggestions to the user. For example, as described with FIGS. 2-4, pattern P2, P3, or P4 may be the highest rated pattern depending on the specified objectives. In some embodiments, the suggestions are provided to the user prior to and/or independent of a pattern being used in a model representing the real-world system. In some embodiments, the suggestions are provided to the user based on detecting a pattern being used in a model representing the real-world system. In some embodiments, the ratings are stored with the metric data and the association in a library. In some embodiments, ratings for the patterns are stored in a library for use when the pattern is to be used or is used in a model representing the real-world system.

In some aspects, the described systems and methods provide for identifying a pattern representing one or more computations executable in a modeling environment and objectives for the pattern or the model, e.g., computer memory usage, execution efficiency, and/or execution performance, etc. and, based on the objectives and the computations represented by the pattern, identifying one or more alternative patterns that represent the computations. The alternative patterns may be semantically equivalent but syntactically and/or structurally different from the pattern. A recommendation on replacing the pattern with one of the alternative patterns may be provided based on the objectives and respective metric data associated with the patterns. Additionally or alternatively, the alternative patterns and the respective metric data associated with the patterns may be provided to a user to allow the user to choose between the alternative patterns. Additionally or alternatively, one of the alternative patterns may be selected based on the objectives and the respective metric data associated with the patterns for achieving the objectives.

In some embodiments, the process described in FIG. 7 may be used to generate metric data for patterns independent of building models, e.g., for library usage, to generate metric data for patterns identified during or after a model is built, or other suitable purposes. For example, any new patterns identified may be saved in a library for future use.

Figure 8:
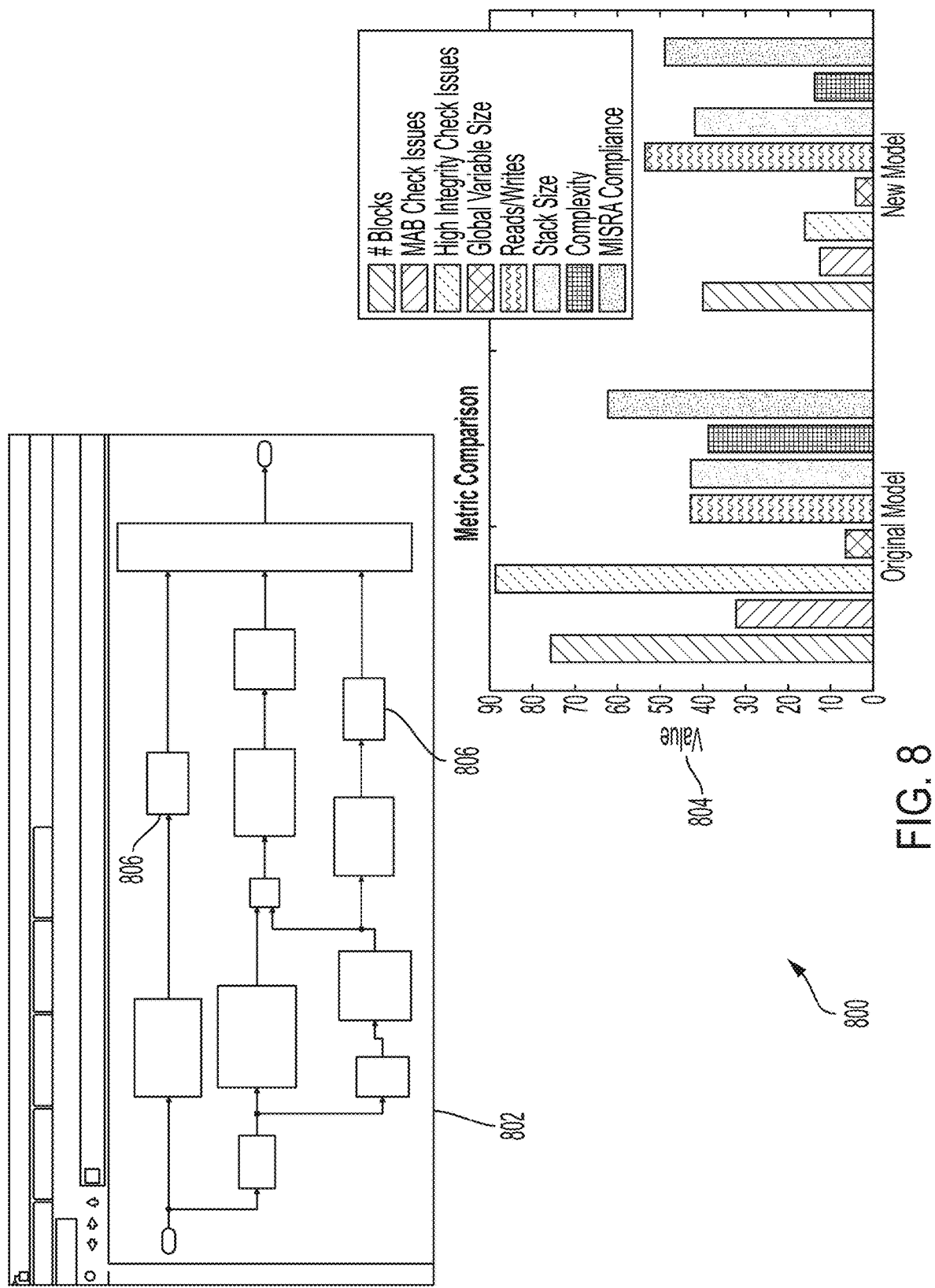
FIG. 8 depicts yet another exemplary metric data for patterns in a modeling environment.

FIG. 8 depicts an interface 800 for a modeling environment where metric data for patterns is provided, e.g., in the modeling environment. The modeling environment may be supported by a system, such as system 600 of FIG. 6. In this example, a model 802 is displayed in the interface 800. The model includes graphical program code, e.g., input by a user of the modeling environment. The user may select a pattern of blocks in the model, such as pattern 806, and receive metric data regarding the pattern according to the process for generating metric data described above. Additionally or alternatively, based on the specified objectives (e.g., computer memory usage, execution efficiency, execution performance, or another suitable objective), the user of the modeling environment may receive evaluation data, e.g., metric data relating to the objectives, for the objectives and/or a recommendation to keep an existing pattern in the model or replace the existing pattern with an alternative pattern. For example, the evaluation data may include the information displayed in graph 804 where the existing pattern and the alternative pattern are compared using their metric data.

In particular, based on the objectives and the computations represented by the pattern, the system may identify alternative patterns that represent the same computations. The alternative patterns may be semantically equivalent but syntactically and/or structurally different from the pattern. The system may provide a recommendation on replacing the pattern with one of the alternative patterns based on the objectives and respective metric data associated with the patterns, such as computer memory usage data, complexity data, compliance violation data, and/or other suitable metric data. Additionally or alternatively, the system may provide the alternative patterns and the respective metric data associated with the pattern and each of the alternative patterns for allowing a user to choose between the alternative patterns. Additionally or alternatively, the system may automatically select one of the alternative patterns based on the objectives and the respective metric data associated with the patterns for achieving the objectives.

For example, the user may select an option in the modeling environment to find one or more suitable alternatives for an existing pattern in the model. Additionally or alternatively, the system may automatically identify an existing pattern in the model, e.g., pattern 806, that may be a good candidate for suitable alternatives from the pattern library. The system may search for semantically, syntactically, and/or structurally equivalent patterns from the pattern library and identify an alternative pattern. The system may compute metric data for the existing pattern and for the alternative pattern. The system may generate a display, such as graph 804, to compare the metric data for the existing pattern and the alternative pattern. The user may choose to keep the existing pattern or replace it with the alternative pattern based on the metric data. For example, the user may place a high priority on the model complexity objective. On observing the corresponding metric data for number of blocks, the user may recognize that the number of blocks for the alternative pattern ("New Model") is smaller than the number of blocks for the existing pattern ("Original Model"). Accordingly, the user may choose to replace the existing pattern with the alternative pattern for this reason. In another example, the user may place a high priority on the stack objective. On observing the corresponding metric data for stack size, the user may observe that the value for the alternative pattern ("New Model") is the same as the value for the existing pattern ("Original Model"). Accordingly, the user may choose to retain the existing pattern for this reason. Additionally or alternatively, the system may compare the metric data and based on evaluating the patterns in view of the objectives, the system may recommend keeping the existing pattern or replacing it with the alternative pattern. For example, using a process similar to that described with respect to FIGS. 2-4, the system may receive one or more objectives and their order of priority and determine whether or not to replace the existing pattern with the alternative pattern depending on the metric data corresponding to the objectives. In an example, based on absolute priority ordering, the system may receive one or more objectives with a highest priority assigned to the model guidelines objective. The system may receive metric data corresponding to the model guidelines objective, which is captured by the MAB check issues metric. The system may determine that the existing pattern should be replaced with the alternative pattern depending on the value for the MAB check issues metric being smaller for the alternative pattern ("New Model") when compared to the value for the MAB check issues metric for the existing pattern ("Original Model").

Figure 9:
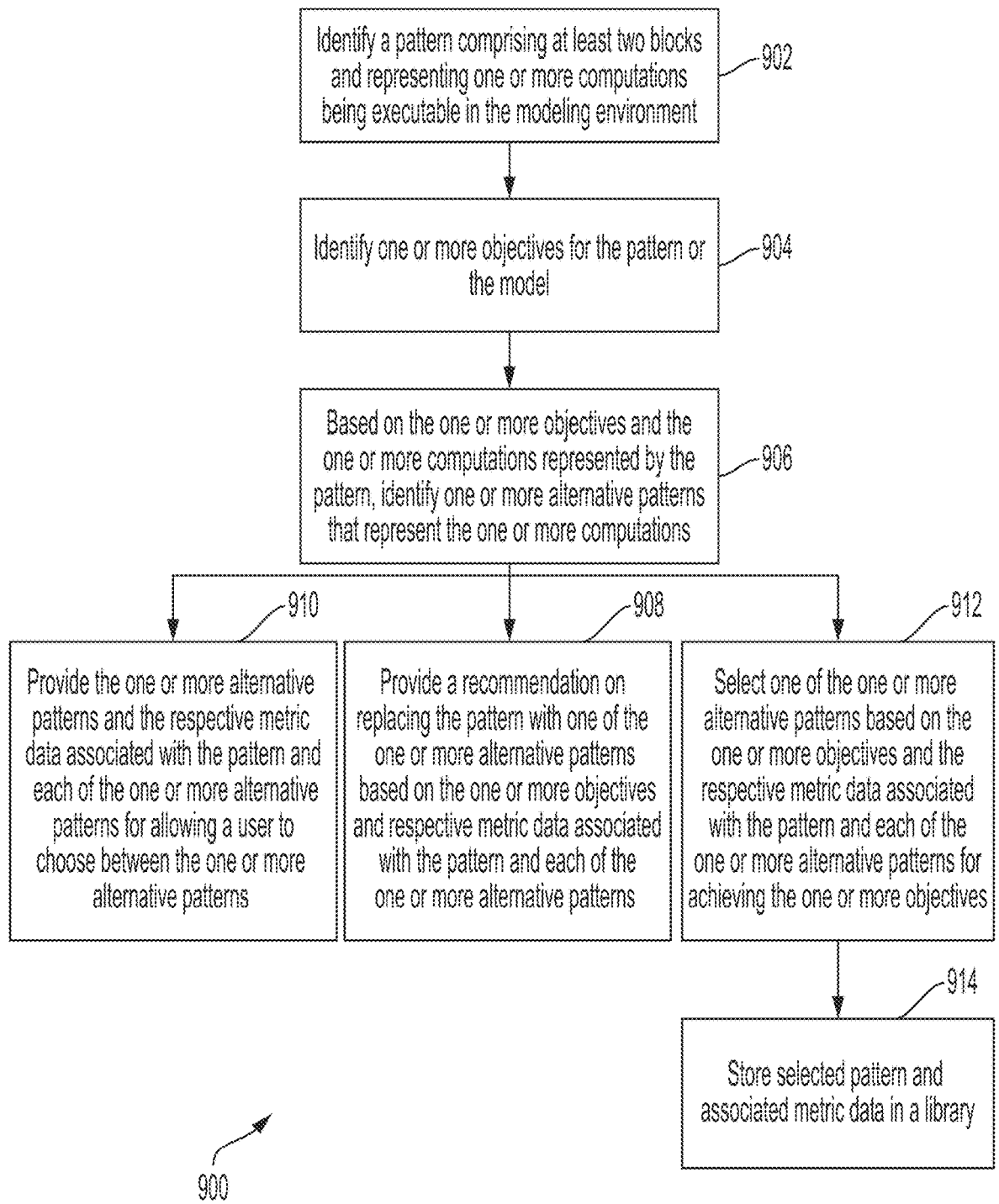
FIG. 9 depicts an exemplary method for implementing another embodiment of the systems and/or methods described herein.

FIG. 9 depicts an exemplary method 900 for implementing the systems and/or methods described herein. This exemplary method may be used to provide, for an existing pattern, alternative patterns and metric data for allowing a user to choose between the alternative patterns, a recommendation on which alternative pattern to replace the existing pattern, and/or automatically select an alternative pattern to replace the existing pattern. The system may execute this exemplary method on one or more processors in communication with memory to provide metric data for patterns in a modeling environment. For example, method 900 may be executed using system 600 in FIG. 6. The method may be executed for a model comprising model elements, where at least some of the model elements are blocks. The blocks may represent computations associated with operation or behavior of a real-world system, e.g., an embedded system in an automobile, an aircraft, a satellite, an industrial equipment, or another suitable real-world system in domains such as automotive, aerospace, communication engineering, electronics, industrial automation, and other industries.

At step 902, the system identifies a pattern comprising at least two blocks and representing one or more computations. For example, the system may identify pattern 806 from model 802 in FIG. 8.

At step 904, the system identifies one or more objectives for the pattern or the model, e.g., to improve aspects of the code, such as computer memory usage, execution efficiency, and/or execution performance. The objectives may be predetermined, user-specified, or a combination thereof.

At step 906, the system identifies one or more alternative patterns that represent the computations based on the objectives and the computations represented by the pattern. The alternative patterns may be semantically equivalent but syntactically and/or structurally different from the pattern. In some embodiments, the system identifies one or more alternative patterns that represent the computations initially based on the computations represented by the pattern. In embodiments where this information may not be sufficient to identify an alternative pattern, the system may identify one or more alternative patterns further based on one or more objectives for the pattern.

The metric data may include computer memory usage data, complexity data, compliance violation data, and/or other suitable metric data. While in some embodiments, the metric data and/or the alternative patterns are generated dynamically or on demand, in additional or alternative embodiments, metric data and/or the alternative patterns are generated at a prior time and stored and retrieved from a library or another storage.

The metrics may include model metrics and/or code metrics. The model metrics are independent of a target platform. The code metrics may be dependent on the target platform. In some embodiments, the same code may have different performance metrics depending on the platform/architecture. For example, performance metrics for the same code may be dependent on the number of cores and/or threads provided by the target platform. In such cases, while some code metrics may be dependent on the target platform, other code metrics may not be dependent on the target platform. The model metrics may include a number of blocks, MAB check issues, and/or high integrity check issues. The code metrics may include code efficiency metrics and/or code style metrics. The code efficiency metrics may include global variable size, stack size, read/write accesses, data copy performance, and/or binary code size. The code style metrics may include complexity violation, readability violation, traceability violation, safety precaution violation, and/or MISRA compliance.

The system optionally performs one or more of steps 908, 910, and 912-914 described below.

At step 908, the system provides a recommendation on replacing the pattern with one of the alternative patterns based on the objectives and respective metric data associated with the pattern and each of the alternative patterns. For example, patterns that are semantically equivalent and syntactically and/or structurally equivalent may be identified, and one or more of the patterns may be selected for providing the recommendation on replacing the pattern with one of the alternative patterns. In this example, additional types of information in addition to the metric data and the objectives are used to select one or more of the patterns for providing the recommendation on replacing the pattern with one of the alternative patterns. The additional types of information may include usage contexts and/or datatypes that are commonly used for the pattern. For example, based on the metrics, a pattern P1 may have the lowest violations across all datatypes, while a pattern P2 may have higher violations overall but lower violations for double datatype than pattern P1. In the context of the model, if the double datatype is specified, pattern P2 may be selected over pattern P1. In another example, patterns that are semantically equivalent but syntactically and/or structurally different may be identified, and one or more of the patterns may be selected for providing the recommendation on replacing the pattern with one of the alternative patterns.

At step 910, the system provides the alternative patterns and the respective metric data associated with the pattern and each of the alternative patterns for allowing a user to choose between the alternative patterns. For example, the system may generate an interface including graph 804 from FIG. 8 to allow the user to compare the metric data for the patterns and choose from the patterns based on their analysis of the metric data.

At step 912, the system automatically selects one of the alternative patterns based on the objectives and the respective metric data associated with the pattern and each of the alternative patterns for achieving the objectives. For example, one of the alternative patterns may be selected for simulation, code generation, and/or verification and validation. The system may automatically select the alternative pattern based on objectives and order of priority, e.g., from a user or another suitable source. The system may analyze the metric data corresponding to the provided objectives and determine which alternative pattern to select based on analyzing the metric data, e.g., as described with respect to FIGS. 2-4. In another example, a pattern P1 may produce the most efficient code, but may be harder to verify with design simulations than other patterns. In such a case, a different pattern P2 that is easier to verify with design simulations than pattern P1 may be selected for validation of the design.

At step 914, the system stores the selected pattern and associated metric data in a library.

Figure 10:
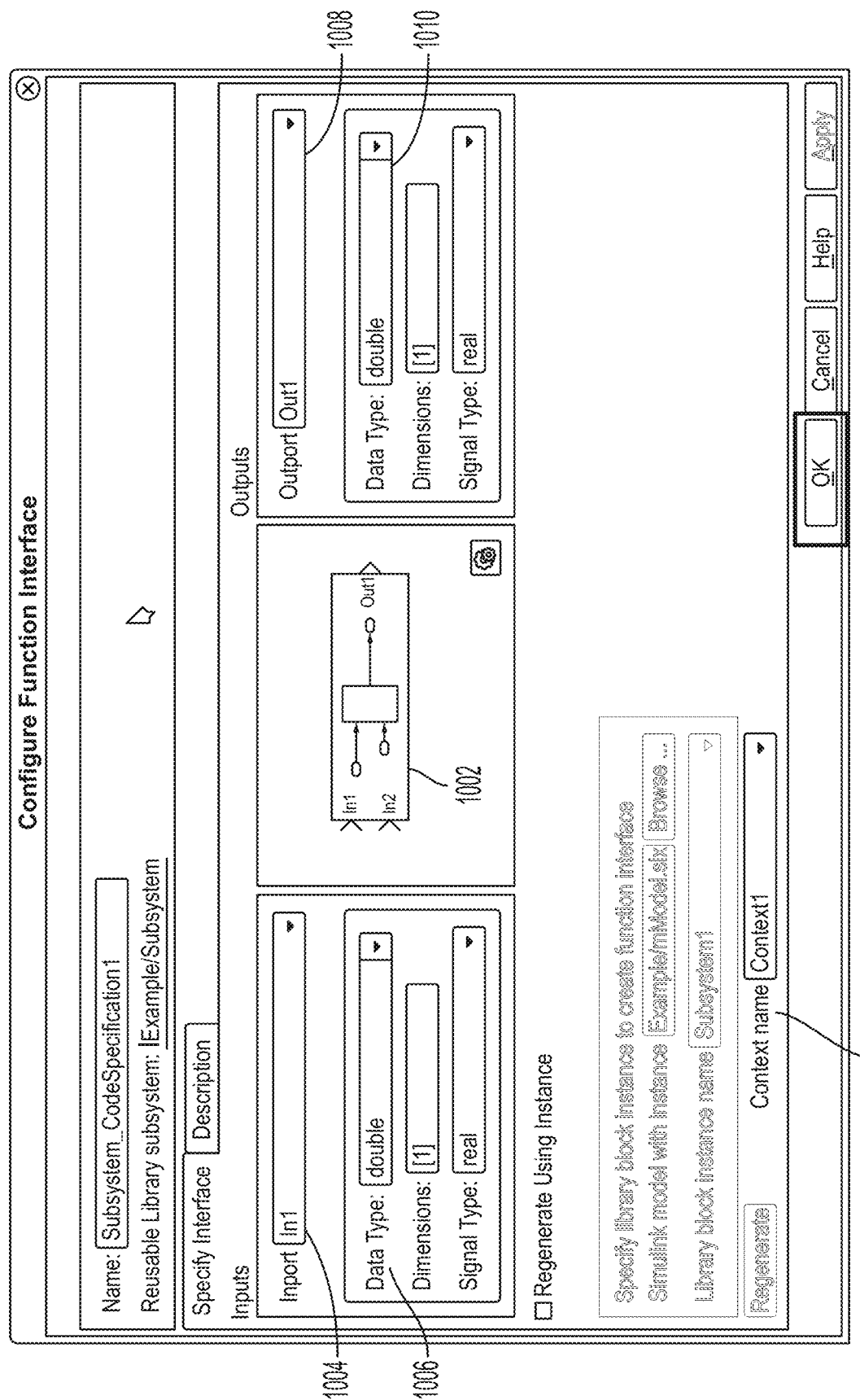
FIG. 10 depicts an exemplary interface for selecting a context for a pattern.

FIG. 10 depicts an exemplary interface for selecting a context for a pattern. In interface 1000, the user may specify a context in the form of a data type for the inputs and/or outputs for pattern 1002. In particular, the user may select an input 1004, e.g., In1, and specify a data type 1006, e.g., double, and related information, such as dimensions and signal type. Similarly, the user may select an output 1008, e.g., Out1, and specify a data type 1010, e.g., double, and related information, such as dimensions and signal type. For example, for the four patterns identified in FIG. 1, the two contexts for each pattern may be specified using interface 1000, including the first context with a double data type and a second context with a single data type. Similarly, the context for other patterns described in this disclosure, including FIGS. 2-4 and 8, may be specified using interface 1000 or another suitable interface. In another example, a context for a library block that has already been designed may be selected using option 1012. Each specified input, output, data type, dimension, and signal may result in a different context. These contexts may be viewable from the library using option 1012.

Figure 11A:
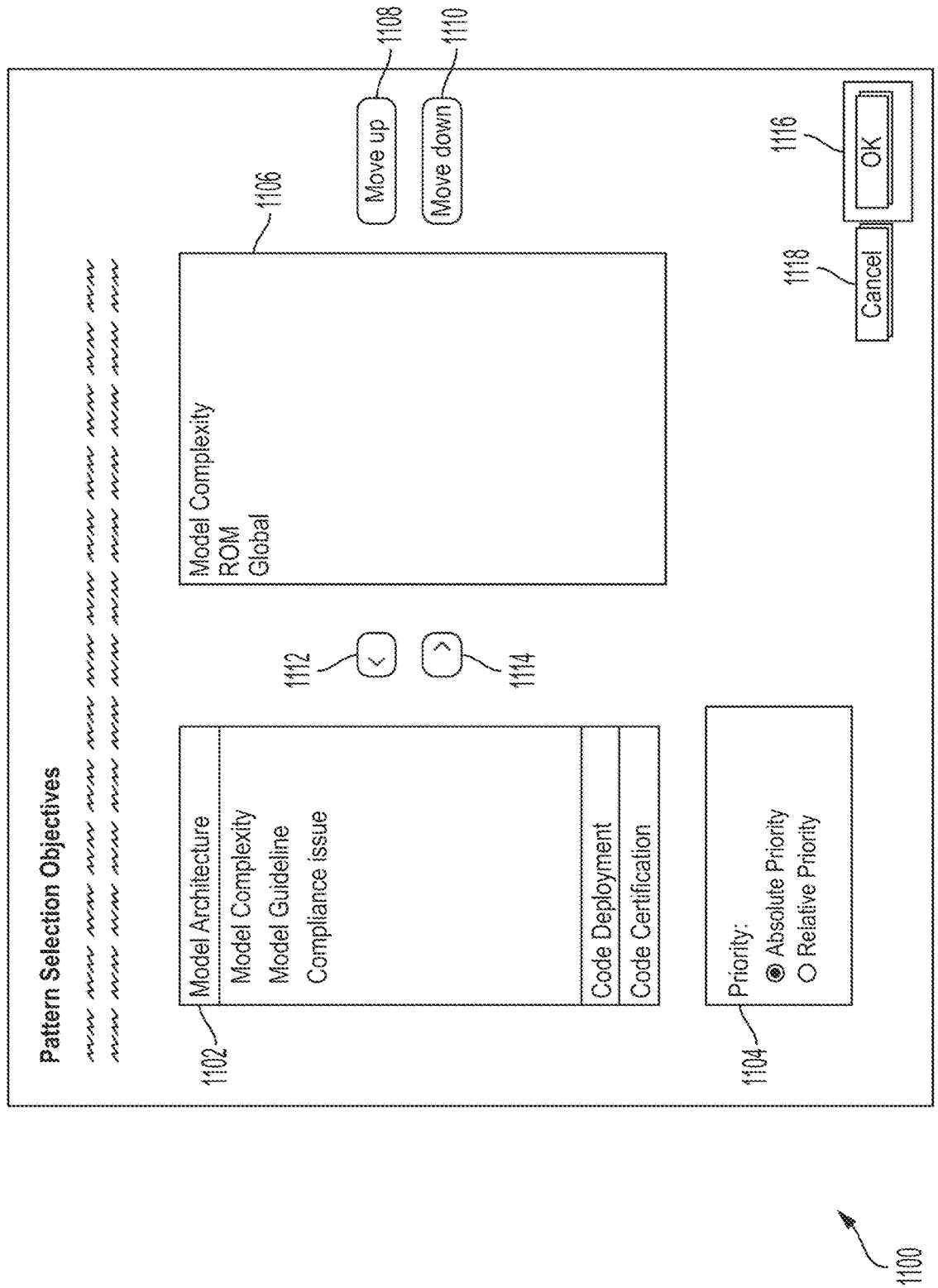
FIGS. 11A-11B depict exemplary interfaces for selecting an objective for a pattern.
Figure 11B:
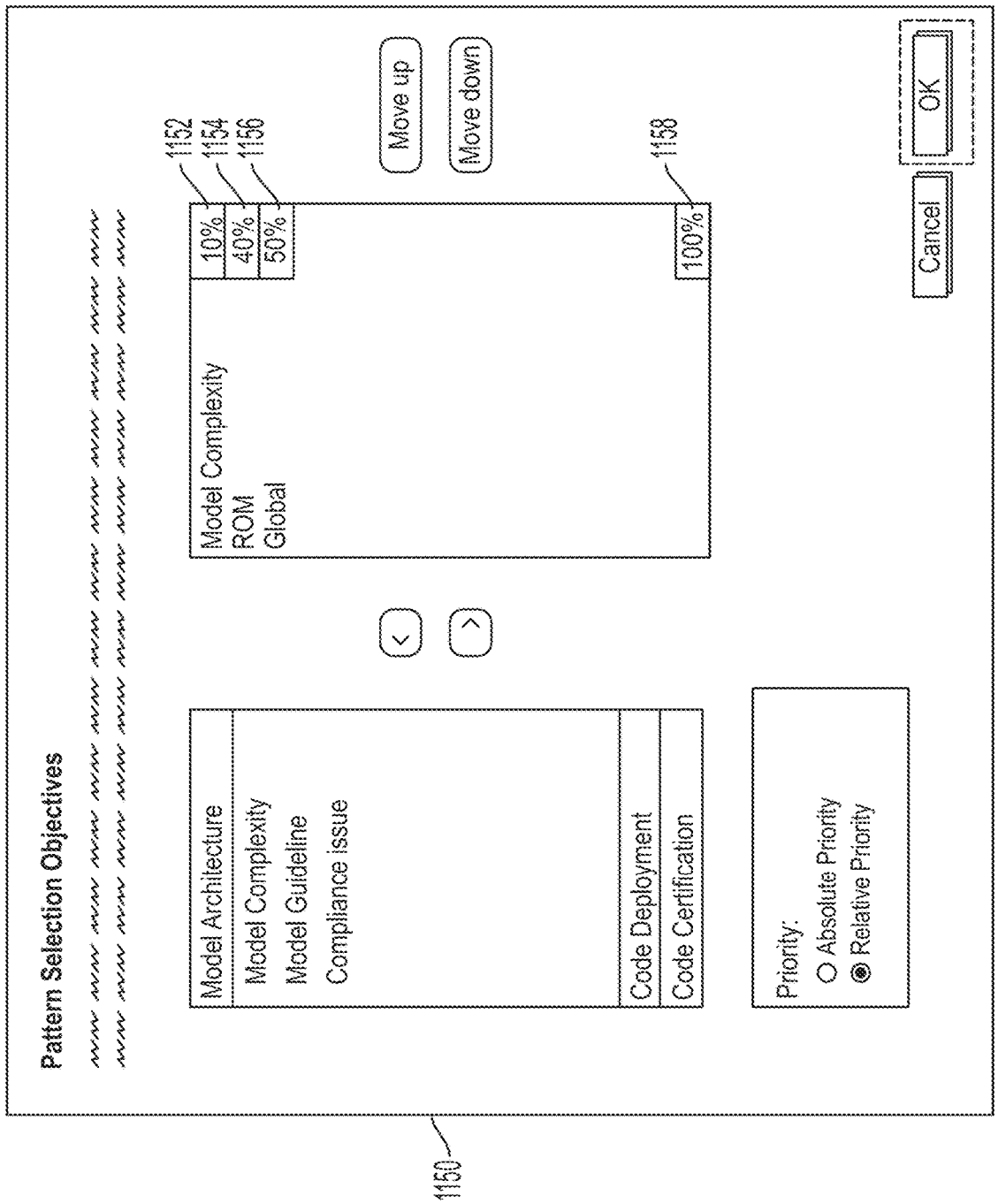

FIG. 11A depicts an exemplary interface for selecting an objective for a pattern. In interface 1100, the user may select an objective from one or more objectives for the pattern from window 1102. For example, if the user is interested in objectives relating to Model Architecture, the user may select from Model Complexity, Model Guidelines, and Compliance Issues objectives. The user may then select option 1114 to include the desired objective, e.g., Model Complexity. The Model Complexity objective may then appear in window 1106. The user may select option 1112 to remove an objective from window 1106. Additionally or alternatively, in window 1102, the user may choose from other objectives relating to Code Deployment, Code Certification, or another suitable set of objectives, to add to the objectives selected for the pattern and appearing in window 1106. The user may decide on a priority order for the selected objectives in window 1106 by moving an objective up or down using option 1108 or 1110, respectively. In some embodiments, the user may move the objective up or down by highlighting and dragging and dropping the objective, or using another suitable means provided by the interface. For example, in window 1106, the Model Complexity objective is given the highest priority, followed by the ROM and Global objectives. The user may select a type of ordering applied to the analysis by selecting between absolute priority ordering and relative priority ordering from window 1104. In a subsequent interface, shown in FIG. 11B, the user may provide weights for the selected objectives should the user choose relative priority ordering from window 1104. For example, using interface 1150, the user may enter weights 1152, 1154, and 1156 for the objectives, such that they add up to 100% as indicated in 1158. In the example shown, the user provides 10% weight to the Model Complexity objective, 40% weight to the ROM objective, and 50% weight to the Global objective. The user may finalize his or her selections by selecting option 1116 or discard his or her selections by selecting option 1118. For example, the user may specify the objectives and their order of priority for the analyses in FIGS. 2-4 using interface 1100 or another suitable interface. In another example, the user may specify the objectives and their weights for relative priority ordering using interfaces 1100 and 1150, and when finalizing the selections via option 1116, the system may verify that the weights add up to 100%. Otherwise the system may request the user to update the weights such that they add up to 100%. Additionally or alternatively, the system may update the weights automatically such that they add up to 100%. For example, the system may increase or decrease the weight for each objective such that the sum of the weights adds up to 100%, e.g., in proportion to the user specified weights for the objectives, or using another suitable method.

Figure 12:
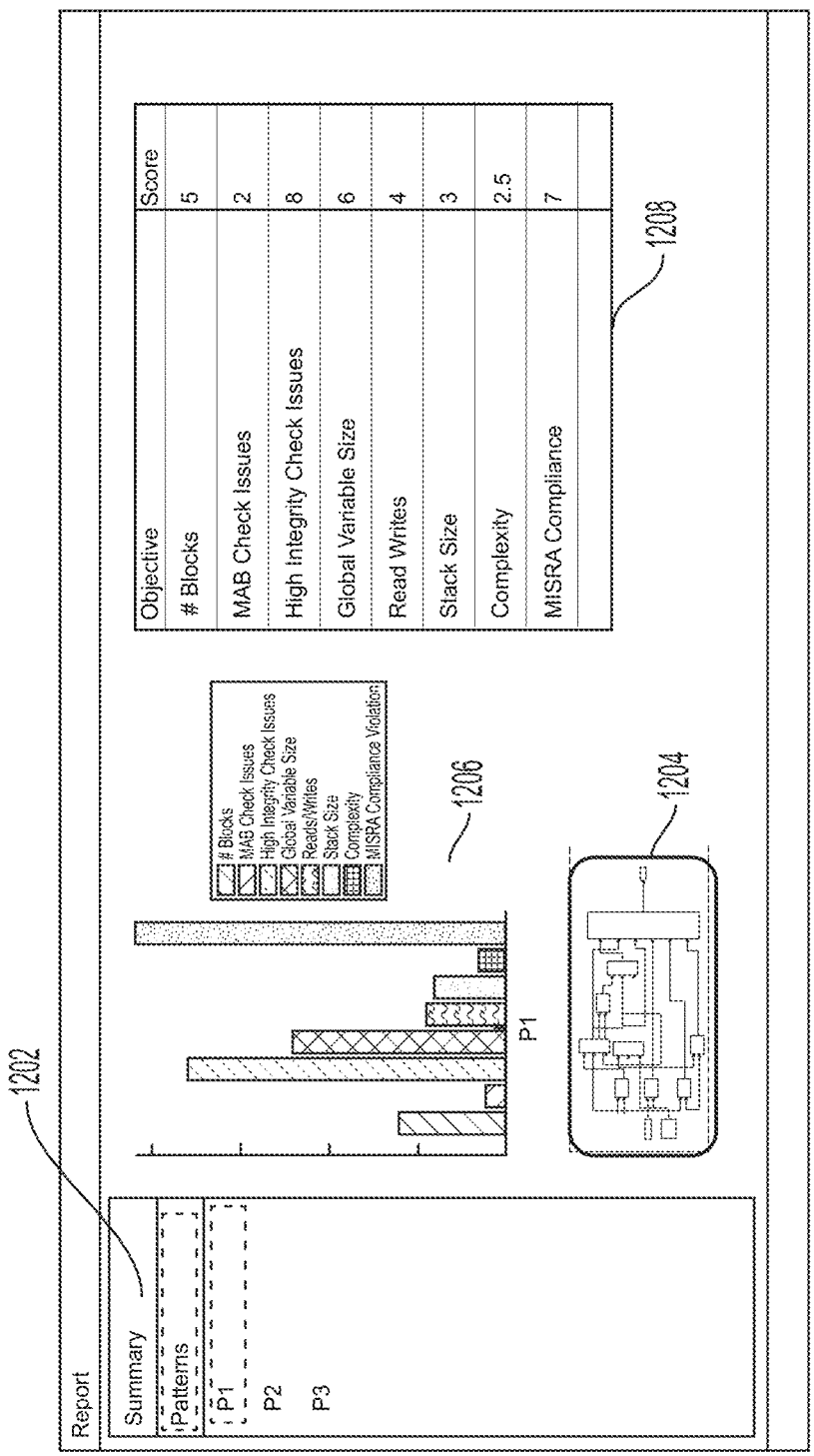
FIGS. 12-13 depict an exemplary interface for displaying a report for a pattern.
Figure 13:
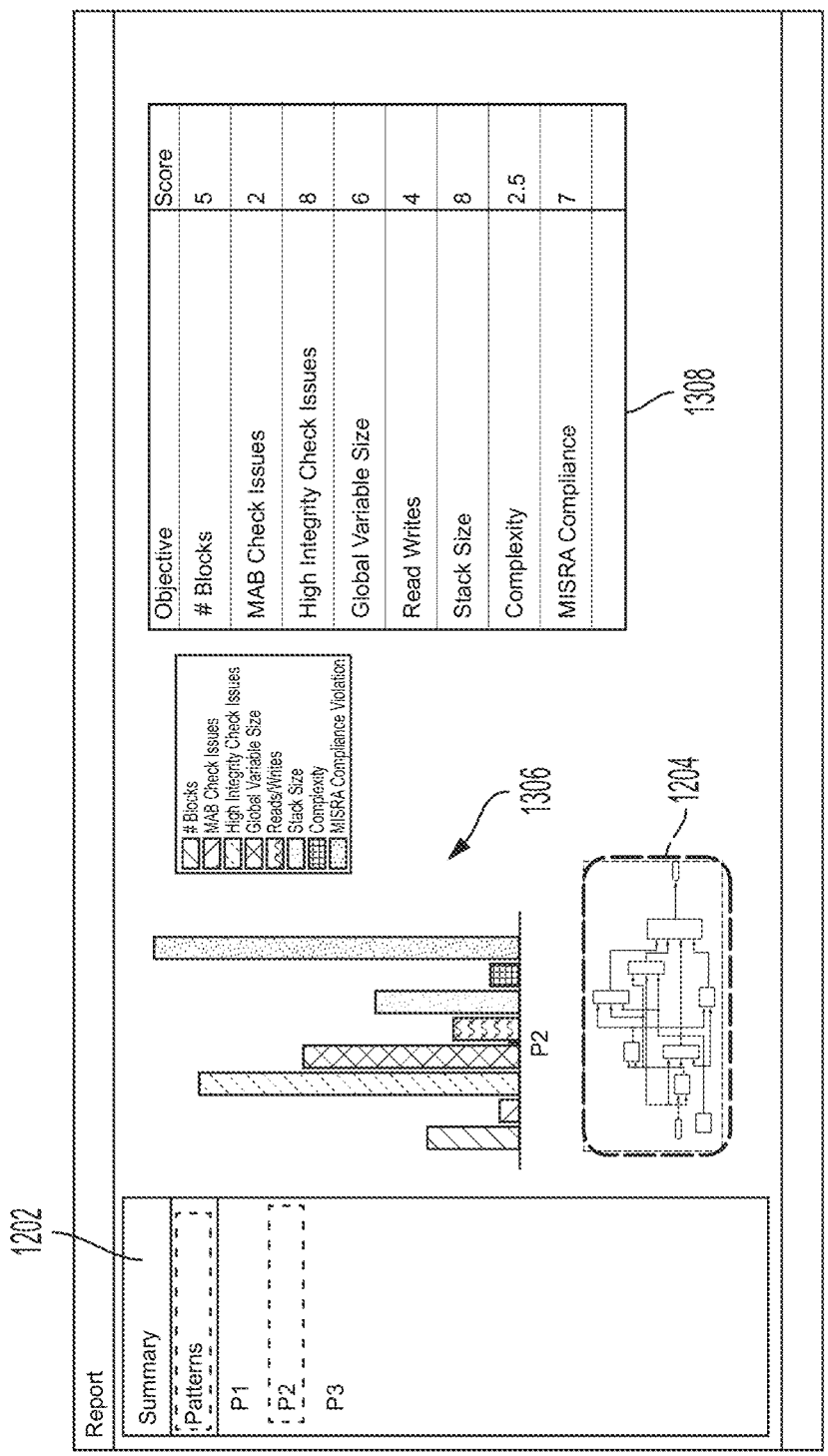

FIGS. 12-13 depict an exemplary interface for displaying a report for a pattern. In interfaces 1200 and 1300, the user may select a pattern from window 1202, e.g., pattern P1, P2, or P3. For example, the user may use this interface to browse the patterns in a library with corresponding metric data, receive corresponding reports, and accordingly select a pattern for use in a model. In particular, in interface 1200, the user selects pattern P1 from window 1202 and, in interface 1300, the user selects pattern P2 from window 1202. The selected pattern may be displayed in window 1204. In interface 1200, the system may perform an analysis for metric data related to one or more objectives and display a graph 1206 and/or a table 1208 in order to report the metric data for pattern P1 to the user. The metric data may have been generated at a prior time and retrieved from the library or may be generated when the user selects the pattern from window 1202 or a combination thereof. For example, the graph 1206 may display metric data for number of blocks, MAB check issues, high integrity check issues, global variable size, read writes, stack size, complexity, and MISRA compliance. The table 1208 may display corresponding values for each metric. Similarly, in interface 1300, the system may perform an analysis for metric data related to one or more objectives and display a graph 1306 and/or a table 1308 in order to report the metric data for pattern P2 to the user. The user may compare the graphs 1206 and 1306 and/or tables 1208 and 1308 in order to choose between pattern P1 and P2. For example, if the user prioritizes number of blocks over other objectives, the user may observe that both patterns P1 and P2 have the same value for that objective. The user may choose either pattern as they are equivalent with respect to this objective. In another example, if the user prioritizes stack size over other objectives, the user may observe that pattern P1 has a lower value (e.g., 3) than pattern P2 (e.g., 8) and may accordingly choose pattern P1 as it has the lowest value. Additionally or alternatively, the data may be presented side by side so it is easy for the user to compare the patterns. In one example, a color scheme may be used to indicate the best score for an objective (e.g., using a green font or a fill color of a table cell) and the worst score for the objective (e.g., using a red color font or a fill color of a table cell).

Figure 14:
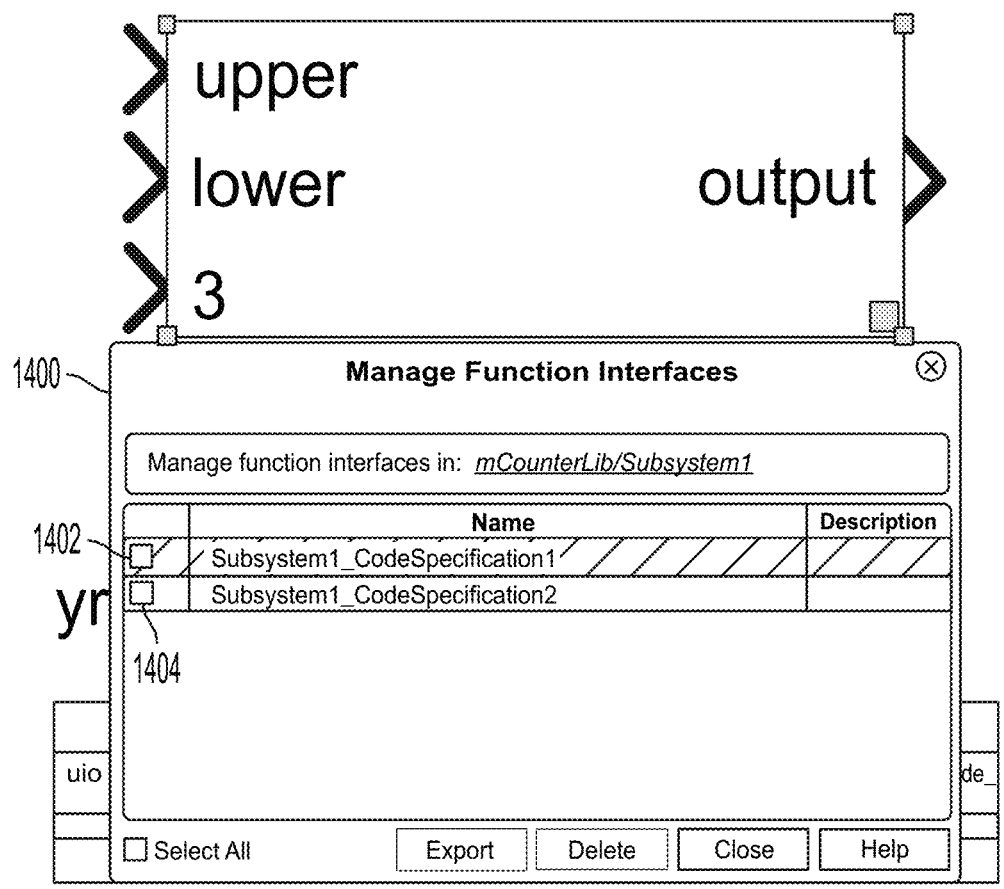
FIGS. 14-15 depict exemplary interfaces used for selecting an active code generation configuration set.
Figure 15:
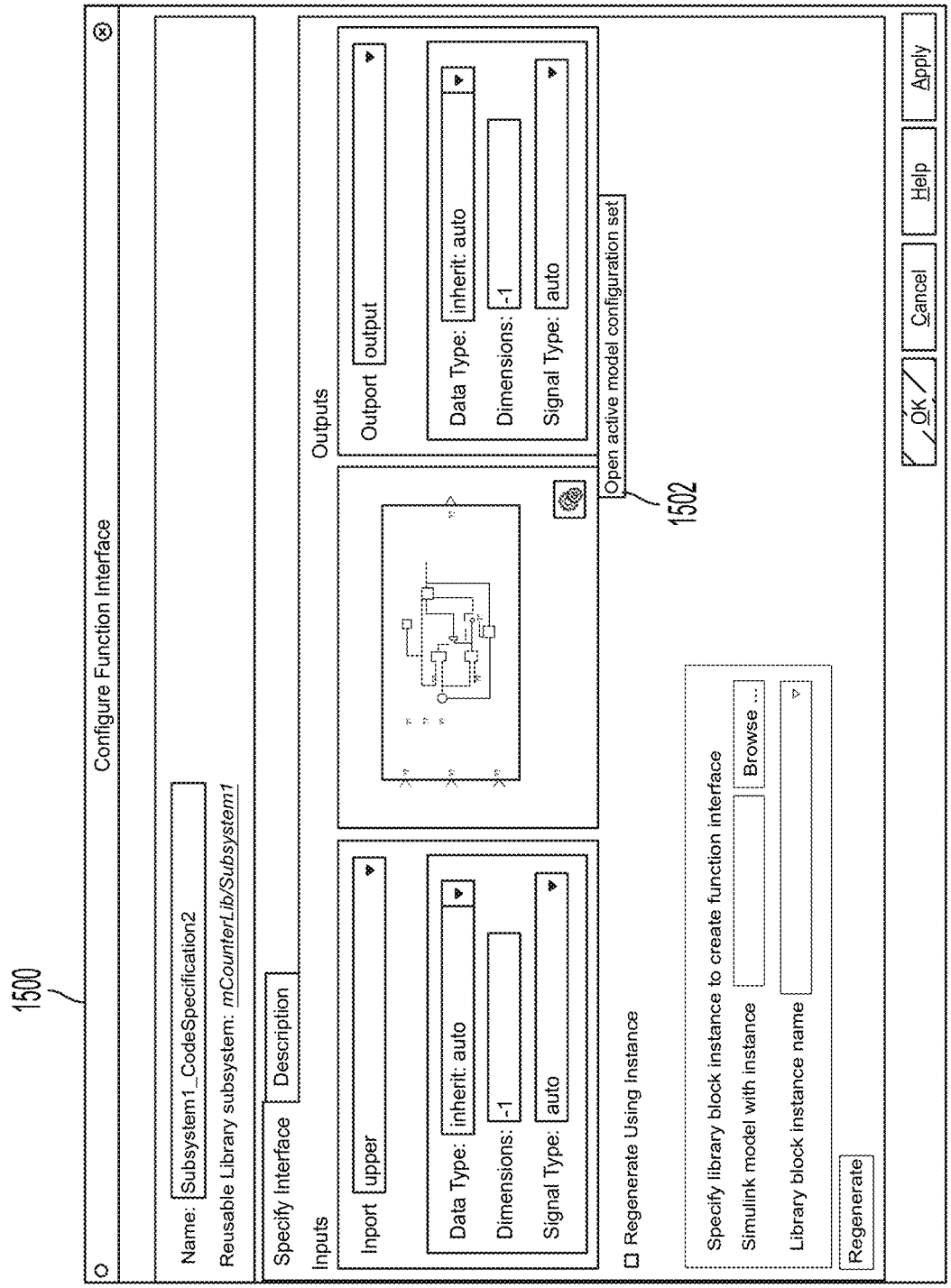

FIGS. 14-15 depict exemplary interfaces for selecting an active code generation configuration set from a loaded model or workspace. In some embodiments, a particular code generation configuration set may be selected and may then be used to generate code for different contexts. FIG. 14 shows an exemplary interface 1400 where the user may select between box 1402 (to select "Subsystem1_CodeSpecification1") and box 1404 (to select "Subsystem1_CodeSpecification2"). FIG. 15 shows an exemplary interface 1500 shown subsequent to the user selecting box 1404 in FIG. 14. Using option 1502, the user may select the option to open the active model configuration set. After a particular code generation configuration is selected, it may be used to generate code for different contexts.

CONCLUSION

Systems and methods for providing metric data for patterns in a modeling environment are disclosed.

In some aspects, contexts for generating metric data for a pattern are constructed. The pattern represents one or more computations executable in the modeling environment and associated with operation or behavior of a real-world system. The contexts may include information about input and/or output to the pattern. The metric data is associated with one or more objectives with which the use of the pattern is associated. Code for the pattern for each context is generated. Metric data is generated for the pattern and under each context. The metric data of the pattern under each context is associated with the objectives. The metric data and the association is stored for use in providing information about or based on the metric data when the pattern is to be or is used in a model representing the real-world system.

In some aspects, a pattern representing one or more computations being executable in the modeling environment is identified. The computations are associated with operation or behavior of a real-world system. One or more objectives for the pattern or the model are identified. Based on the objectives and the computations represented by the pattern, one or more alternative patterns that represent the computations are identified. The alternative patterns are semantically equivalent but syntactically and/or structurally different from the pattern. A recommendation on replacing the pattern with one of the alternative patterns may be provided, based on the objectives and respective metric data associated with the pattern and the alternative patterns. Additionally or alternatively, the alternative patterns and the respective metric data associated with the pattern and the alternative patterns may be provided for allowing a user to choose between the alternative patterns. Additionally or alternatively, the alternative patterns may be provided based on the objectives and the respective metric data associated with the pattern and the alternative patterns for achieving the objectives.

While aspects of the systems and methods herein are described with respect to graphical program code, the systems and methods described herein may be equally applicable to textual program code, a combination of graphical and textual program code, or another suitable means for inputting code into the modeling environment. Moreover, while aspects of the systems and methods herein are described with respect to code generation from graphical models, the systems and methods described herein may be equally applicable to code generation, simulation, verification, and validation from suitable code input into the modeling environment.

In some aspects, the systems and/or methods described herein may be configured as described below:

(1) A method, comprising:

for each pattern of two or more patterns, the pattern comprising at least two blocks and representing one or more computations being executable in a modeling environment, the one or more computations being associated with operation or behavior of a real-world system:

constructing, using one or more processors, one or more contexts for generating metric data for the pattern, the one or more contexts comprising information about the pattern, the metric data being associated with one or more objectives with which the use of the pattern is associated, the one or more objectives comprising computer memory usage, execution efficiency, and/or execution performance;

generating, for each context in the one or more contexts, code for the pattern;

generating, by the one or more processors, for the pattern and under each context, metric data, the metric data comprising computer memory usage data, complexity data, and/or compliance violation data, the generating comprising executing or analyzing the code;

associating the metric data of the pattern under each context with the one or more objectives; and storing the metric data and the association for use in providing information about the metric data or information based on the metric data when the pattern is to be used or is used in a model representing the real-world system.

(2) The method according to (1), wherein respective metric data for each of the two or more patterns is generated prior to use in a model in the modeling environment, and wherein the respective metric data or information based on the respective metric data is provided when one of the two or more patterns is used in the model.

(3) The method according to (1), wherein the metric data and the association are stored in a library.

(4) The method according to (1), wherein each pattern of the two or more patterns is rated based on the one or more objectives and/or priority of the one or more objectives, and one or more ratings for the pattern are provided as suggestions to the user.

(5) The method according to (4), wherein the suggestions are provided to the user prior to and/or independent of the pattern being used in a model representing the real-world system.

(6) The method according to (4), wherein the suggestions are provided to the user based on detecting the pattern being used in a model representing the real-world system.

(7) The method according to (4), wherein the ratings are stored with the metric data and the association in a library.

(8) The method according to (1), wherein a model in the modeling environment includes one or more textual elements.

(9) The method according to (1), wherein ratings for the two or more patterns are stored in a library for use when the pattern is to be used or is used in a model representing the real-world system.

(10) The method according to (1), wherein the metric data is generated for each pattern and under each context based on a target platform for the code of the pattern.

(11) The method according to (1), wherein the code for the pattern is generated based on the one or more objectives and/or priority of the one or more objectives.

(12) The method according to (1), wherein the metric data include model metrics and/or code metrics, wherein the model metrics are independent of a target platform, and wherein the code metrics are dependent on the target platform.

(13) The method according to (12), wherein the model metrics include a number of blocks, MAB check issues, and/or high integrity check issues.

(14) The method according to (12), wherein the code metrics include code efficiency metrics and/or code style metrics.

(15) The method according to (14), wherein the code efficiency metrics include global variable size, stack size, read/write accesses, data copy performance, and/or binary code size.

(16) The method according to (14), wherein the code style metrics include complexity violation, readability violation, traceability violation, safety precaution violation, and/or MISRA compliance.

(17) A system, comprising:
at least one computer hardware processor; and
at least one non-transitory computer-readable storage medium storing processor-executable instructions that, when executed by the at least one computer hardware processor, cause the at least one computer hardware processor to perform the acts of:
for each pattern of two or more patterns, the pattern comprising at least two blocks and representing one or more computations being executable in a modeling environment, the one or more computations being associated with operation or behavior of a real-world system:
constructing, using one or more processors, one or more contexts for generating metric data for the pattern, the one or more contexts comprising information about the pattern, the metric data being associated with one or more objectives with which the use of the pattern is associated, the one or more objectives comprising computer memory usage, execution efficiency, and/or execution performance;
generating, for each context in the one or more contexts, code for the pattern;
generating, by the one or more processors, for the pattern and under each context, metric data, the metric data comprising computer memory usage data, complexity data, and/or compliance violation data, the generating comprising executing or analyzing the code;
associating the metric data of the pattern under each context with the one or more objectives; and
storing the metric data and the association for use in providing information about the metric data or information based on the metric data when the pattern is to be used or is used in a model representing the real-world system.

(18) At least one non-transitory computer-readable storage medium storing processor-executable instructions that, when executed by at least one computer hardware processor, cause the at least one computer hardware processor to perform the acts of:
for each pattern of two or more patterns, the pattern comprising at least two blocks and representing one or more computations being executable in a modeling environment, the one or more computations being associated with operation or behavior of a real-world system:
constructing, using one or more processors, one or more contexts for generating metric data for the pattern, the one or more contexts comprising information about the pattern, the metric data being associated with one or more objectives with which the use of the pattern is associated, the one or more objectives comprising computer memory usage, execution efficiency, and/or execution performance;
generating, for each context in the one or more contexts, code for the pattern;
generating, by the one or more processors, for the pattern and under each context, metric data, the metric data comprising computer memory usage data, complexity data, and/or compliance violation data, the generating comprising executing or analyzing the code;
associating the metric data of the pattern under each context with the one or more objectives; and
storing the metric data and the association for use in providing information about the metric data or information based on the metric data when the pattern is to be used or is used in a model representing the real-world system.

(19) A method, comprising:
for a model comprising model elements, at least some of the model elements being blocks, the model being executable in a modeling environment:
identifying a pattern comprising at least two blocks and representing one or more computations being executable in the modeling environment, the one or more computations being associated with operation or behavior of a real-world system;
identifying one or more objectives for the pattern or the model, the one or more objectives comprising computer memory usage, execution efficiency, and/or execution performance;
based on the one or more objectives and the one or more computations represented by the pattern, identifying one or more alternative patterns that represent the one or more computations, the one or more alternative patterns being semantically equivalent but syntactically and/or structurally different from the pattern; and
providing a recommendation on replacing the pattern with one of the one or more alternative patterns based on the one or more objectives and respective metric data associated with the pattern and each of the one or more alternative patterns, the metric data comprising computer memory usage data, complexity data, and/or compliance violation data, or
providing the one or more alternative patterns and the respective metric data associated with the pattern and each of the one or more alternative patterns for allowing a user to choose between the one or more alternative patterns, or selecting one of the one or more alternative patterns based on the one or more objectives and the respective metric data associated with the pattern and each of the one or more alternative patterns for achieving the one or more objectives.

(20) The method according to (19), wherein two or more patterns that are semantically equivalent and syntactically and/or structurally equivalent are identified, and one or more of the patterns are selected for providing the recommendation on replacing the pattern with one of the one or more alternative patterns.

(21) The method according to (19), wherein additional types of information in addition to the metric data and the one or more objectives are used to select one or more of the patterns for providing the recommendation the determination.

(22) The method according to (19), wherein two or more patterns that are semantically equivalent but syntactically and/or structurally different are identified, and one or more of the patterns are selected for providing the recommendation on replacing the pattern with one of the one or more alternative patterns.

(23) The method according to (19), wherein the metric data and/or the one or more alternative patterns are generated dynamically or on demand.

(24) The method according to (19), wherein the metric data and/or the one or more alternative patterns are generated at a prior time and stored and retrieved from a library or another storage.

(25) The method according to (19), wherein selecting one of the one or more alternative patterns comprises selecting one of the one or more alternative patterns for simulation, code generation, and/or verification and validation.

(26) The method according to (19), wherein the metric data include model metrics and/or code metrics, wherein the model metrics are independent of a target platform, and wherein the code metrics are dependent on the target platform.

(27) The method according to (26), wherein the model metrics include a number of blocks, MAB check issues, and/or high integrity check issues.

(28) The method according to (26), wherein the code metrics include code efficiency metrics and/or code style metrics.

(29) The method according to (28), wherein the code efficiency metrics include global variable size, stack size, read/write accesses, data copy performance, and/or binary code size.

(30) The method according to (28), wherein the code style metrics include complexity violation, readability violation, traceability violation, safety precaution violation, and/or MISRA compliance.

(31) A system, comprising:
at least one computer hardware processor; and
at least one non-transitory computer-readable storage medium storing processor-executable instructions that, when executed by the at least one computer hardware processor, cause the at least one computer hardware processor to perform the acts of:
for a model comprising model elements, at least some of the model elements being blocks, the model being executable in a modeling environment:
identifying a pattern comprising at least two blocks and representing one or more computations being executable in the modeling environment, the one or more computations being associated with operation or behavior of a real-world system;
identifying one or more objectives for the pattern or the model, the one or more objectives comprising computer memory usage, execution efficiency, and/or execution performance;
based on the one or more objectives and the one or more computations represented by the pattern, identifying one or more alternative patterns that represent the one or more computations, the one or more alternative patterns being semantically equivalent but syntactically and/or structurally different from the pattern; and
providing a recommendation on replacing the pattern with one of the one or more alternative patterns based on the one or more objectives and respective metric data associated with the pattern and each of the one or more alternative patterns, the metric data comprising computer memory usage data, complexity data, and/or compliance violation data, or
providing the one or more alternative patterns and the respective metric data associated with the pattern and each of the one or more alternative patterns for allowing a user to choose between the one or more alternative patterns, or
selecting one of the one or more alternative patterns based on the one or more objectives and the respective metric data associated with the pattern and each of the one or more alternative patterns for achieving the one or more objectives.

(32) At least one non-transitory computer-readable storage medium storing processor-executable instructions that, when executed by at least one computer hardware processor, cause the at least one computer hardware processor to perform the acts of:
for a model comprising model elements, at least some of the model elements being blocks, the model being executable in a modeling environment:
identifying a pattern comprising at least two blocks and representing one or more computations being executable in the modeling environment, the one or more computations being associated with operation or behavior of a real-world system;
identifying one or more objectives for the pattern or the model, the one or more objectives comprising computer memory usage, execution efficiency, and/or execution performance;
based on the one or more objectives and the one or more computations represented by the pattern, identifying one or more alternative patterns that represent the one or more computations, the one or more alternative patterns being semantically equivalent but syntactically and/or structurally different from the pattern; and
providing a recommendation on replacing the pattern with one of the one or more alternative patterns based on the one or more objectives and respective metric data associated with the pattern and each of the one or more alternative patterns, the metric data comprising computer memory usage data, complexity data, and/or compliance violation data, or
providing the one or more alternative patterns and the respective metric data associated with the pattern and each of the one or more alternative patterns for allowing a user to choose between the one or more alternative patterns, or
selecting one of the one or more alternative patterns based on the one or more objectives and the respective metric data associated with the pattern and each of the one or more alternative patterns for achieving the one or more objectives.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "module" that performs one or more functions. This module may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

The invention claimed is:

1. A method, comprising:
for a model comprising model elements, at least some of the model elements being blocks, the model being executable in a modeling environment:
identifying a pattern comprising at least two blocks and representing one or more computations being executable in the modeling environment, the one or more computations being associated with operation or behavior of a real-world system;
identifying one or more objectives for the pattern or the model, the one or more objectives comprising computer memory usage, execution efficiency, and/or execution performance;
based on the one or more objectives and the one or more computations represented by the pattern, identifying one or more alternative patterns that represent the one or more computations, the one or more alternative patterns being semantically equivalent but syntactically and/or structurally different from the pattern; and
providing a recommendation on replacing the pattern with one of the one or more alternative patterns based on the one or more objectives and respective metric data associated with the pattern and each of the one or more alternative patterns, the metric data comprising computer memory usage data, complexity data, and/or compliance violation data, or
providing the one or more alternative patterns and the respective metric data associated with the pattern and each of the one or more alternative patterns for allowing a user to choose between the one or more alternative patterns, or
selecting one of the one or more alternative patterns based on the one or more objectives and the respective metric data associated with the pattern and each of the one or more alternative patterns for achieving the one or more objectives.

2. The method of claim 1, wherein two or more patterns that are semantically equivalent and syntactically and/or structurally equivalent are identified, and one or more of the patterns are selected for providing the recommendation on replacing the pattern with one of the one or more alternative patterns.

3. The method of claim 1, wherein additional types of information in addition to the metric data and the one or more objectives are used to select one or more of the patterns for providing the recommendation the determination.

4. The method of claim 1, wherein two or more patterns that are semantically equivalent but syntactically and/or structurally different are identified, and one or more of the patterns are selected for providing the recommendation on replacing the pattern with one of the one or more alternative patterns.

5. The method of claim 1, wherein the metric data and/or the one or more alternative patterns are generated dynamically or on demand.

6. The method of claim 1, wherein the metric data and/or the one or more alternative patterns are generated at a prior time and stored and retrieved from a library or another storage.

7. The method of claim 1, wherein selecting one of the one or more alternative patterns comprises selecting one of the one or more alternative patterns for simulation, code generation, and/or verification and validation.

8. The method of claim 1, wherein the metric data include model metrics and/or code metrics, wherein the model metrics are independent of a target platform, and wherein the code metrics are dependent on the target platform.

9. The method of claim 8, wherein the model metrics include a number of blocks, MAB check issues, and/or high integrity check issues.

10. The method of claim 8, wherein the code metrics include code efficiency metrics and/or code style metrics.

11. The method of claim 10, wherein the code efficiency metrics include global variable size, stack size, read/write accesses, data copy performance, and/or binary code size.

12. The method of claim 10, wherein the code style metrics include complexity violation, readability violation, traceability violation, safety precaution violation, and/or MISRA compliance.

13. A system, comprising:
at least one computer hardware processor; and
at least one non-transitory computer-readable storage medium storing processor-executable instructions that, when executed by the at least one computer hardware processor, cause the at least one computer hardware processor to perform the acts of:
for a model comprising model elements, at least some of the model elements being blocks, the model being executable in a modeling environment:

identifying a pattern comprising at least two blocks and representing one or more computations being executable in the modeling environment, the one or more computations being associated with operation or behavior of a real-world system;

identifying one or more objectives for the pattern or the model, the one or more objectives comprising computer memory usage, execution efficiency, and/or execution performance;

based on the one or more objectives and the one or more computations represented by the pattern, identifying one or more alternative patterns that represent the one or more computations, the one or more alternative patterns being semantically equivalent but syntactically and/or structurally different from the pattern; and providing a recommendation on replacing the pattern with one of the one or more alternative patterns based on the one or more objectives and respective metric data associated with the pattern and each of the one or more alternative patterns, the metric data comprising computer memory usage data, complexity data, and/or compliance violation data, or providing the one or more alternative patterns and the respective metric data associated with the pattern and each of the one or more alternative patterns for allowing a user to choose between the one or more alternative patterns, or selecting one of the one or more alternative patterns based on the one or more objectives and the respective metric data associated with the pattern and each of the one or more alternative patterns for achieving the one or more objectives.

14. The system of claim 13, wherein additional types of information in addition to the metric data and the one or more objectives are used to select one or more of the patterns for providing the recommendation the determination.

15. The system of claim 13, wherein the metric data and/or the one or more alternative patterns are generated:
dynamically or on demand; or
at a prior time and stored and retrieved from a library or another storage; or both.

16. The system of claim 13, wherein the metric data include model metrics and/or code metrics, wherein the model metrics are independent of a target platform, and wherein the code metrics are dependent on the target platform.

17. The system of claim 16, wherein the model metrics include a number of blocks, MAB check issues, and/or high integrity check issues.

18. The system of claim 16, wherein the code metrics include code efficiency metrics and/or code style metrics.

19. The system of claim 18, wherein the code efficiency metrics include global variable size, stack size, read/write accesses, data copy performance, and/or binary code size.

20. The system of claim 18, wherein the code style metrics include complexity violation, readability violation, traceability violation, safety precaution violation, and/or MISRA compliance.

21. At least one non-transitory computer-readable storage medium storing processor-executable instructions that, when executed by at least one computer hardware processor, cause the at least one computer hardware processor to perform the acts of:

for a model comprising model elements, at least some of the model elements being blocks, the model being executable in a modeling environment:

identifying a pattern comprising at least two blocks and representing one or more computations being executable in the modeling environment, the one or more computations being associated with operation or behavior of a real-world system;

identifying one or more objectives for the pattern or the model, the one or more objectives comprising computer memory usage, execution efficiency, and/or execution performance;

based on the one or more objectives and the one or more computations represented by the pattern, identifying one or more alternative patterns that represent the one or more computations, the one or more alternative patterns being semantically equivalent but syntactically and/or structurally different from the pattern; and providing a recommendation on replacing the pattern with one of the one or more alternative patterns based on the one or more objectives and respective metric data associated with the pattern and each of the one or more alternative patterns, the metric data comprising computer memory usage data, complexity data, and/or compliance violation data, or providing the one or more alternative patterns and the respective metric data associated with the pattern and each of the one or more alternative patterns for allowing a user to choose between the one or more alternative patterns, or selecting one of the one or more alternative patterns based on the one or more objectives and the respective metric data associated with the pattern and each of the one or more alternative patterns for achieving the one or more objectives.

22. The at least one non-transitory computer-readable medium of claim 21, wherein two or more patterns that are semantically equivalent and syntactically and/or structurally equivalent are identified, and one or more of the patterns are selected for providing the recommendation on replacing the pattern with one of the one or more alternative patterns.

23. The at least one non-transitory computer-readable medium of claim 21, wherein additional types of information in addition to the metric data and the one or more objectives are used to select one or more of the patterns for providing the recommendation the determination.

24. The at least one non-transitory computer-readable medium of claim 21, wherein two or more patterns that are semantically equivalent but syntactically and/or structurally different are identified, and one or more of the patterns are selected for providing the recommendation on replacing the pattern with one of the one or more alternative patterns.

25. The at least one non-transitory computer-readable medium of claim 21, wherein the metric data and/or the one or more alternative patterns are generated dynamically or on demand.

26. The at least one non-transitory computer-readable medium of claim 21, wherein the metric data and/or the one or more alternative patterns are generated at a prior time and stored and retrieved from a library or another storage.

27. The at least one non-transitory computer-readable medium of claim 21, wherein selecting one of the one or more alternative patterns comprises selecting one of the one or more alternative patterns for simulation, code generation, and/or verification and validation.

28. The at least one non-transitory computer-readable medium of claim 21, wherein the metric data include model metrics and/or code metrics, wherein the model metrics are independent of a target platform, and wherein the code metrics are dependent on the target platform.

29. The at least one non-transitory computer-readable medium of claim 28, wherein the model metrics include a number of blocks, MAB check issues, and/or high integrity check issues.

30. The at least one non-transitory computer-readable medium of claim 28, wherein the code metrics include code efficiency metrics and/or code style metrics.

31. The at least one non-transitory computer-readable medium of claim 30, wherein the code efficiency metrics include global variable size, stack size, read/write accesses, data copy performance, and/or binary code size.

32. The at least one non-transitory computer-readable medium of claim 30, wherein the code style metrics include complexity violation, readability violation, traceability violation, safety precaution violation, and/or MISRA compliance.

* * * * *

UNITED STATES PATENT AND TRADEMARK OFFICE
CERTIFICATE OF CORRECTION

| | | |
|---|---|---|
| PATENT NO. | : 11,782,682 B2 | |
| APPLICATION NO. | : 17/374806 | |
| DATED | : October 10, 2023 | |
| INVENTOR(S) | : Huanhuan Xu et al. | |

It is certified that error appears in the above-identified patent and that said Letters Patent is hereby corrected as shown below:

In the Claims

Claim 1, at Column 30, Line 1, "the metric data" should read --the respective metric data--.

Claim 2, at Column 30, Lines 17-18, "one or more of the patterns" should read --one or more of the two or more patterns--.

Claim 3, at Column 30, Lines 22-24, "to the metric data and the one or more objectives are used to select one or more of the patterns for providing the recommendation the determination" should read --to the respective metric data and the one or more objectives are used to select at least one of the one or more alternative patterns for providing the recommendation--.

Claim 4, at Column 30, Lines 27-28, "one or more of the patterns" should read --one or more of the two or more patterns--.

Claim 5, at Column 30, Line 31, "wherein the metric" should read --wherein the respective metric--.

Claim 6, at Column 30, Line 34, "wherein the metric" should read --wherein the respective metric--.

Claim 8, at Column 30, Lines 42-43, "wherein the metric data include model" should read --wherein the respective metric data includes model--.

Claim 13, at Column 30, Line 64, "perform the acts" should read --perform acts--.

Claim 13, at Column 31, Lines 22-23, "the metric data" should read --the respective metric data--.

Claim 14, at Column 31, Lines 38-40, "the metric data and the one or more objectives are used to select one or more of the patterns for providing the recommendation the determination" should read --the respective metric data and the one or more objectives are used to select at least one of the one or more alternative patterns for providing the recommendation--.

Signed and Sealed this
Twenty-eighth Day of November, 2023

Katherine Kelly Vidal
*Director of the United States Patent and Trademark Office*

CERTIFICATE OF CORRECTION (continued)
U.S. Pat. No. 11,782,682 B2

Claim 15, at Column 31, Line 41, "the metric data" should read --the respective metric data--.

Claim 16, at Column 31, Line 46, "the metric data" should read --the respective metric data--.

Claim 21, at Column 31, Line 67, "perform the acts" should read --perform acts--.

Claim 21, at Column 32, Line 25, "the metric data" should read --the respective metric data--.

Claim 22, at Column 32, Lines 38-39, "computer-readable medium" should read --computer-readable storage medium--.

Claim 22, at Column 32, Line 41, "one or more of the patterns" should read --one or more of the two or more patterns--.

Claim 23, at Column 32, Lines 44-45, "computer-readable medium" should read --computer-readable storage medium--.

Claim 23, at Column 32, Line 46, "to the metric data" should read --to the respective metric data--.

Claim 23, at Column 32, Lines 47-48, "select one or more of the patterns for providing the recommendation the determination" should read --select at least one of the one or more alternative patterns for providing the recommendation--.

Claim 24, at Column 32, Lines 49-50, "computer-readable medium" should read --computer-readable storage medium--.

Claim 24, at Column 32, Line 52, "one or more of the patterns" should read --one or more of the two or more patterns--.

Claim 25, at Column 32, Line 56, "medium of claim 21, wherein the metric data" should read --storage medium of claim 21, wherein the respective metric data--.

Claim 26, at Column 32, Line 60, "medium of claim 21, wherein the metric data" should read --storage medium of claim 21, wherein the respective metric data--.

Claim 27, at Column 32, Lines 63-64, "computer-readable medium" should read --computer-readable storage medium--.

Claim 28, at Column 33, Line 2, "medium of claim 21, wherein the metric data" should read --storage medium of claim 21, wherein the respective metric data--.

Claim 29, at Column 33, Lines 6-7, "computer-readable medium" should read --computer-readable storage medium--.

Claim 30, at Column 33, Lines 10-11, "computer-readable medium" should read --computer-readable storage medium--.

CERTIFICATE OF CORRECTION (continued)
U.S. Pat. No. 11,782,682 B2

Claim 31, at Column 33, Lines 13-14, "computer-readable medium" should read --computer-readable storage medium--.

Claim 32, at Column 33, Lines 17-18, "computer-readable medium" should read --computer-readable storage medium--.